United States Patent
Nakajima et al.

(10) Patent No.: US 8,078,815 B2
(45) Date of Patent: Dec. 13, 2011

(54) POWER-SAVING-BACKUP MANAGEMENT METHOD

(75) Inventors: Noriko Nakajima, Machida (JP); Yuichi Taguchi, Sagamihara (JP); Jun Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 681 days.

(21) Appl. No.: 12/247,508

(22) Filed: Oct. 8, 2008

(65) Prior Publication Data

US 2010/0049916 A1 Feb. 25, 2010

(30) Foreign Application Priority Data

Aug. 21, 2008 (JP) ................................. 2008-212367

(51) Int. Cl.
*G06F 12/16* (2006.01)
(52) U.S. Cl. ......... 711/162; 711/114; 711/161; 714/6.1; 714/6.23
(58) Field of Classification Search .................. 711/114, 711/161, 162; 714/6.1, 6.23
See application file for complete search history.

(56) References Cited

U.S. PATENT DOCUMENTS

2002/0120811 A1* 8/2002 Maeda .......................... 711/105
2006/0164506 A1 7/2006 Kitao

FOREIGN PATENT DOCUMENTS

JP 2006-187993 7/2006

* cited by examiner

*Primary Examiner* — Jae Yu
(74) *Attorney, Agent, or Firm* — Brundidge & Stanger, P.C.

(57) ABSTRACT

A storage subsystem includes: a controller; a first logical storage area corresponding to a RAID group configured by a plurality of storage devices; and a second logical storage area corresponding to a plurality of the RAID groups each configured by the plurality of storage devices, and storing a copy of data stored in the first logical storage area. In the storage subsystem, the first and second logical storage areas form a copy group, and for starting copying from the first to second logical storage area, the controller performs a mode change, from a power saving mode to a ready mode, to the plurality of storage devices configuring the plurality of RAID groups corresponding to the second logical storage area. With such a storage subsystem, the time can be reduced for activating copy-destination storage devices to which a power saving function is applied, and the copy time is thus favorably reduced.

16 Claims, 31 Drawing Sheets

STORAGE CONFIGURATION DIAGRAM
(FIRST EXAMPLE)

BACKUP MANAGEMENT SERVER

MANAGEMENT COMPUTER

FIG. 7

RAID GROUP CONFIGURATION INFORMATION

| RAID GROUP IDENTIFICATION INFORMATION (10011) | STORAGE CAPACITY INFORMATION (10012) | MAGNETIC DISK DRIVE IDENTIFICATION INFORMATION (10013) | | | |
|---|---|---|---|---|---|
| | | #1 | #2 | #3 | #4 |
| RG-01 | 900GB | HD-01 | HD-02 | HD-03 | HD-04 |
| RG-11 | 438GB | HD-11 | HD-12 | HD-13 | HD-14 |
| ... | | ... | ... | ... | ... |

LOGICAL STORAGE AREA CONFIGURATION INFORMATION

| LOGICAL STORAGE AREA IDENTIFICATION INFORMATION (10021) | RAID GROUP IDENTIFICATION INFORMATION (10022) | START BLOCK ADDRESS (10023) | END BLOCK ADDRESS (10024) |
|---|---|---|---|
| LD-01 | RG-01 | 0x0001 | 0x0030 |
| LD-02 | RG-01 | 0x0001 | 0x0030 |
| LD-03 | RG-02 | 0x0001 | 0x0030 |
| LD-04 | RG-03 | 0x0001 | 0x0030 |
| LD-05 | RG-04 | 0x0001 | 0x0030 |
| LD-06 | RG-04 | 0x0001 | 0x0030 |
| LD-11 | RG-11 | 0x0001 | 0x0030 |
| LD-12 | RG-12 | 0x0001 | 0x0030 |
| LD-13 | RG-11 | 0x0001 | 0x0030 |
| LD-14 | RG-13 | 0x0001 | 0x0030 |
| LD-15 | RG-14 | 0x0001 | 0x0030 |
| LD-16 | RG-14 | 0x0001 | 0x0030 |
| LD-17 | RG-11 | 0x0001 | 0x0030 |
| LD-18 | RG-11 | 0x0001 | 0x0030 |
| LD-19 | RG-12 | 0x0001 | 0x0030 |
| ... | ... | ... | ... |

LOGICAL STORAGE UNIT CONFIGURATION INFORMATION

| COMMUNICATIONS INTERFACE IDENTIFICATION INFORMATION (10031) | LOGICAL STORAGE UNIT IDENTIFICATION INFORMATION (10032) | LOGICAL STORAGE AREA IDENTIFICATION INFORMATION (10033) |
|---|---|---|
| 50:00:01:1E:0A:E8:02 | LU-11 | LD-01 |
| 50:00:01:1E:0A:E8:02 | LU-12 | LD-02 |
| 50:00:01:1E:0A:E8:02 | LU-13 | LD-03 |
| ... | ... | ... |

BACKUP CONFIGURATION INFORMATION

| COPY-SOURCE LOGICAL STORAGE AREA IDENTIFICATION INFORMATION (10041) | COPY-DESTINATION LOGICAL STORAGE AREA IDENTIFICATION INFORMATION (10042) |
|---|---|
| LD-01 | LD-11 |
| LD-02 | LD-12 |
| LD-03 | LD-13 |
| LD-04 | LD-14 |
| LD-05 | LD-15 |
| LD-06 | LD-16 |
| LD-07 | LD-17 |
| ... | ... |

UPDATE DATA INFORMATION

| LOGICAL STORAGE AREA IDENTIFICATION INFORMATION | MONITOR START TIME | UPDATE TIME | UPDATE DATA AMOUNT |
|---|---|---|---|
| LD-01 | 070919.04:00 | 070919.10:00 | 20GB |
| LD-02 | 070919.04:00 | 070919.04:00 | 0GB |
| LD-03 | 070919.04:00 | 070920.01:15 | 30GB |
| LD-04 | 070919.04:00 | 070920.01:40 | 20GB |
| LD-05 | 070919.04:00 | 070920.00:40 | 30GB |
| ... | ... | ... | ... |

POWER SUPPLY INFORMATION

| RAID GROUP IDENTIFICATION INFORMATION | POWER SUPPLY STATE |
|---|---|
| RG-11 | OFF |
| RG-12 | OFF |
| RG-13 | OFF |
| RG-14 | OFF |
| RG-15 | OFF |
| ... | ... |

BACKUP MANAGEMENT INFORMATION

| COPY GROUP NUMBER (40011) | COPY-SOURCE LOGICAL STORAGE AREA IDENTIFICATION INFORMATION (40012) | COPY-DESTINATION LOGICAL STORAGE AREA IDENTIFICATION INFORMATION (40013) | UPDATE STOP TIME (40014) | COPY START TIME (40015) |
|---|---|---|---|---|
| 1 | LD-01 | LD-11 | 070920.01:59 | 070920.02:00 |
| 1 | LD-02 | LD-12 | 070920.01:59 | 070920.02:00 |
| 1 | LD-03 | LD-13 | 070920.01:59 | 070920.02:00 |
| 1 | LD-04 | LD-14 | 070920.01:59 | 070920.02:00 |
| 1 | LD-05 | LD-15 | 070920.01:59 | 070920.02:00 |
| 1 | LD-06 | LD-16 | 070920.01:59 | 070920.02:00 |
| 2 | LD-07 | LD-17 | 070920.03:59 | 070920.04:00 |
| ... | ... | ... | ... | ... |

BACKUP OPERATION INFORMATION

| COPY GROUP NUMBER 40021 | PRIMARY LOGICAL STORAGE AREA IDENTIFICATION INFORMATION 40022 | SECONDARY LOGICAL STORAGE AREA IDENTIFICATION INFORMATION 40023 | UPDATE DATA AMOUNT 40024 | COPY ORDER NUMBER 40025 | COPY STATE 40026 |
|---|---|---|---|---|---|
| 1 | LD-01 | LD-11 | 20GB | 1 | |
| 1 | LD-02 | LD-12 | 0GB | Null | |
| 1 | LD-03 | LD-13 | 30GB | 2 | |
| 1 | LD-04 | LD-14 | 20GB | 3 | |
| 1 | LD-05 | LD-15 | 0GB | Null | |
| 1 | LD-06 | LD-16 | 40GB | 6 | |
| 2 | LD-07 | LD-17 | 20GB | 1 | |
| ... | ... | ... | ... | ... | ... |

POWER SUPPLY MANAGEMENT INFORMATION

| COPY GROUP NUMBER (40031) | COPY-DESTINATION RAID GROUP IDENTIFICATION INFORMATION (40032) | UPDATE DATA AMOUNT (40033) | POWER SUPPLY STATE (40034) |
|---|---|---|---|
| 1 | RG-11 | 50GB | OFF |
| 1 | RG-12 | 0GB | OFF |
| 1 | RG-13 | 20GB | OFF |
| 1 | RG-14 | 40GB | OFF |
| 2 | RG-15 | 20GB | OFF |
| ... | ... | ... | ... |

HOST COMPUTER STORAGE AREA CONFIGURATION INFORMATION

| STORAGE VOLUME IDENTIFICATION INFORMATION (30011) | STORAGE DEVICE IDENTIFICATION INFORMATION (30012) | COMMUNICATIONS INTERFACE IDENTIFICATION INFORMATION (30013) | STORAGE UNIT IDENTIFICATION INFORMATION (30014) |
|---|---|---|---|
| /data1 | /dev/sdc1 | 50:00:01:1E:0A:E8:02 | LU-11 |
| /data1 | /dev/sdc1 | 50:00:01:1E:0A:E8:02 | LU-12 |
| /data1 | /dev/sdc1 | 50:00:01:1E:0A:E8:02 | LU-13 |
| /data1 | /dev/sdc1 | 50:00:01:1E:0A:E8:02 | LU-14 |
| /data2 | /dev/sdc2 | 50:00:01:1E:0A:E8:03 | LU-11 |
| /data2 | /dev/sdc2 | 50:00:01:1E:0A:E8:03 | LU-12 |
| ... | ... | ... | ... |

SERVICE INFORMATION

| HOST NAME 50011 | SERVICE GROUP IDENTIFICATION INFORMATION 50012 | STORAGE VOLUME IDENTIFICATION INFORMATION 50013 | STORAGE UNIT IDENTIFICATION INFORMATION 50014 |
|---|---|---|---|
| Host 1 | APP1 | /data1 | LU-11 |
| Host 1 | APP1 | /data1 | LU-12 |
| Host 1 | APP1 | /data1 | LU-13 |
| Host 1 | APP1 | /data1 | LU-14 |
| Host 1 | APP1 | /data2 | LU-11 |
| Host 1 | APP1 | /data2 | LU-12 |
| Host 2 | APP2 | /data3 | LU-11 |
| ... | ... | ... | ... |

5001

BACKUP SETUP PROCESS 2

POWER-ON PROCESS

BACKUP PROCESS

POWER-OFF PROCESS

EXEMPLARY STORAGE CONFIGURATION
(SECOND EXAMPLE)

FIG. 30

POWER SUPPLY MANAGEMENT INFORMATION
(AFTER EXECUTION OF SECOND EXAMPLE)

| COPY GROUP NUMBER (40031) | COPY-DESTINATION RAID GROUP IDENTIFICATION INFORMATION (40032) | UPDATE DATA AMOUNT (40033) | POWER SUPPLY STATE (40034) |
|---|---|---|---|
| 1 | RG-11 | 110GB | OFF |
| 1 | RG-12 | 0GB | OFF |
| 1 | RG-13 | 0GB | OFF |
| 1 | RG-14 | 0GB | OFF |
| 2 | RG-15 | 20GB | OFF |
| ... | ... | ... | ... |

4003

VIRTUAL TAPE LIBRARY CONFIGURATION
(THIRD EXAMPLE)

FIG. 32

VIRTUAL TAPE LIBRARY CONFIGURATION INFORMATION
(THIRD EXAMPLE)

| TAPE RECORDING MEDIUM INFORMATION | LOGICAL STORAGE AREA IDENTIFICATION INFORMATION | START BLOCK ADDRESS | END BLOCK ADDRESS |
|---|---|---|---|
| TP-01 | LD-11 | 0x0001 | 0x0015 |
| TP-01 | LD-13 | 0x00015 | 0x0030 |
| TP-02 | LD-12 | 0x0001 | 0x0030 |
| TP-03 | LD-19 | 0x0001 | 0x0030 |
| TP-04 | LD-14 | 0x0001 | 0x0030 |
| TP-05 | LD-14 | 0x0001 | 0x0030 |
| TP-06 | LD-15 | 0x0001 | 0x0030 |
| ... | ... | ... | ... |

CASCADE CONFIGURATION
(FOURTH EXAMPLE)

REMOTE BACKUP CONFIGURATION
(FIFTH EXAMPLE)

POWER-SAVING-BACKUP MANAGEMENT METHOD

CROSS REFERENCES TO RELATED APPLICATIONS

This application relates to and claims priority from Japanese Patent Application No. P2008-212367, field on Aug. 27, 2008, the entire disclosure of which is incorporated herein by reference.

BACKGROUND OF THE INVENTION

1. Field of the Invention

The present invention relates to a storage system configured by a management computer and a storage subsystem, and a method for controlling such a storage system and, more specifically, to a method for activating a storage device to which a power saving function is applied.

2. Description of the Related Art

1. Storage Area Network

A network connecting one or more computers and one or more storage subsystems called a storage area network (SAN). Such a connection over the SAN between the computer (s) and the storage subsystem (s) is established when a plurality of computers provide one function by working together, or when one or more computers are allowed to share one large-capacity storage subsystem, for example. With such a connection established over the SAN between the computer(s) and the storage subsystem (s), there are advantages of being able to easily add, remove, and replace the storage resources and computer resources as appropriate so that the resulting system can offer excellent scalability.

2. Disk Array Device

The storage subsystem (s) for connection to the SAN are popularly a disk array device(s). The disk array device carries therein a large number of storage devices typified by hard disk and flash memory, for example.

The disk array device manages a plurality of storage devices as a group with the RAID (Redundant Array of Independent Disks) technology. This group of storage devices is referred to as RAID group. The RAID group forms one or more logical storage areas. Any computer connected to the SAN executes a data input/output process with respect to such storage areas. When the computer performs data recording to the storage areas, the disk array device records redundant data of one or two of the storage devices configuring the RAID group. This recording of redundant data leads to advantages of, when any one of the storage devices are broken down, being able to restore the data from the remaining storage devices in the RAID group.

3. Backup Technology

With a well-known backup technology, in a disk array device, two types of logical storage areas are set, i.e., one serves as a copy source, and the other serves as a copy destination. Alternatively, any of a plurality of disk array devices may be set to serve as a primary logical storage area(s) and the remaining disk array devices may be each set to serve as a secondary logical storage area. After such setting, to be ready for possible data loss in the primary logical storage area, data reading is performed therefrom, and thus read data is written into the secondary logical storage area(s).

4. Power Supply Control Technology Based on Service Plan

With a previous power supply control technology, in a storage system including a plurality of storage subsystems, the storage subsystems are each provided with a power supply control program for control of components and a main power supply circuit therein. Based on an operation plan of services utilizing storage areas in the storage devices, a power supply control command program provided in a management computer moves the storage areas to be utilized for the services to any other storage subsystems, and issues a command for controlling the components and the main power supply circuit in each of the storage subsystems. An example includes Patent Document 1 (JP-A-2006-187993).

SUMMARY OF THE INVENTION

Exemplified here is a case where the previous technology of Patent Document 1 is applied to secondary logical storage areas. In the resulting configuration, for backing up data stored in a primary logical storage area, the secondary logical storage areas are sequentially subjected to a process, i.e., a power supply is made to RAID groups including the secondary logical storage areas each being a copy target, and after backup copy, the power supply to the RAID groups is stopped. Such backup copy with respect to the logical storage areas is performed with a wait until the RAID groups including the logical storage areas are activated. As a result, the wait until the RAID groups including the secondary logical storage areas are changed in mode from power saving to normal, i.e., activation wait time, is added to the backup processing time, thereby problematically lengthening the time until the backup process is completed.

Another problem is that a power supply is also made to the RAID groups including the logical storage areas each being a backup target although not actually updated and not requiring copying. This thus causes not only an increase of the time for the backup process but also needless consumption of power.

There is still another problem that any same RAID group may be activated for a plurality of times if a plurality of logical storage areas configuring the RAID group are serving as copy destinations corresponding to a plurality of primary logical storage areas. If this is the case, there are problems that the time needed for activating such a RAID group for a plurality of times is added to the time for the backup process, and activating the RAID group for a plurality of times as such increases the power consumption.

For solving such problems, a first aspect of the invention is directed to a storage subsystem including: a controller; a first logical storage area corresponding to a RAID (Redundancy Array of Independent Disks) group configured by a plurality of storage devices; and a second logical storage area corresponding to a plurality of the RAID groups each configured by the plurality of storage devices, and storing a copy of data stored in the first logical storage area. In the storage subsystem, the first and second logical storage areas form a copy group, and for starting copying from the first to second logical storage area, the controller performs a mode change, from a power saving mode to a ready mode, to the plurality of storage devices configuring the plurality of RAID groups corresponding to the second logical storage area.

Also for solving the problems described above, a second aspect of the invention is directed to a method for controlling a storage subsystem including a first logical storage area corresponding to a RAID group configured by a plurality of storage devices, and a second logical storage area corresponding to a plurality of the RAID groups each configured by the plurality of storage devices and storing a copy of data stored in the first logical storage area. The control method includes the steps of: forming a copy group by the first and second logical storage areas; and performing, for starting copying from the first to second logical storage area, a mode change, from a power saving mode to a ready mode, to the plurality of storage devices configuring the plurality of RAID groups corresponding to the second logical storage area.

There are advantages of being able to reduce the time for activating a storage device being a copy destination to which a power saving function is applied.

BRIEF DESCRIPTION OF THE DRAWINGS

FIG. 7 is a diagram showing exemplary RAID group configuration information in the embodiment of the first example of the invention;

FIG. 8 is a diagram showing exemplary logical storage area configuration information in the embodiment of the first example of the invention;

FIG. 9 is a diagram showing exemplary logical storage unit configuration information in the embodiment of the first example of the invention;

FIG. 10 is a diagram showing exemplary backup configuration information in the embodiment of the first example of the invention;

FIG. 11 is a diagram showing exemplary update data information of the embodiment of the first example of the invention;

FIG. 12 is a diagram showing exemplary power supply information in the embodiment of the first example of the invention;

FIG. 13 is a diagram showing exemplary backup management information in the embodiment of the first example of the invention;

FIG. 14 is a diagram showing exemplary backup operation information in the embodiment of the first example of the invention;

FIG. 15 is a diagram showing exemplary power supply management information in the embodiment of the first example of the invention;

FIG. 16 is a diagram showing exemplary host computer storage area configuration information in the embodiment of the first example of the invention;

FIG. 17 is a diagram showing exemplary service information in the embodiment of the first example of the invention;

FIG. 30 is a diagram showing power supply management information in the embodiment of the second example of the invention;

FIG. 32 is a diagram showing virtual tape library configuration information in the embodiment of the third example of the invention;

DESCRIPTION OF THE PREFERRED EMBODIMENTS

In the below, described are embodiments of the invention by referring to the accompanying drawings. Note that the invention is surely not restricted to the following examples.

1. First Example

Figure 1:
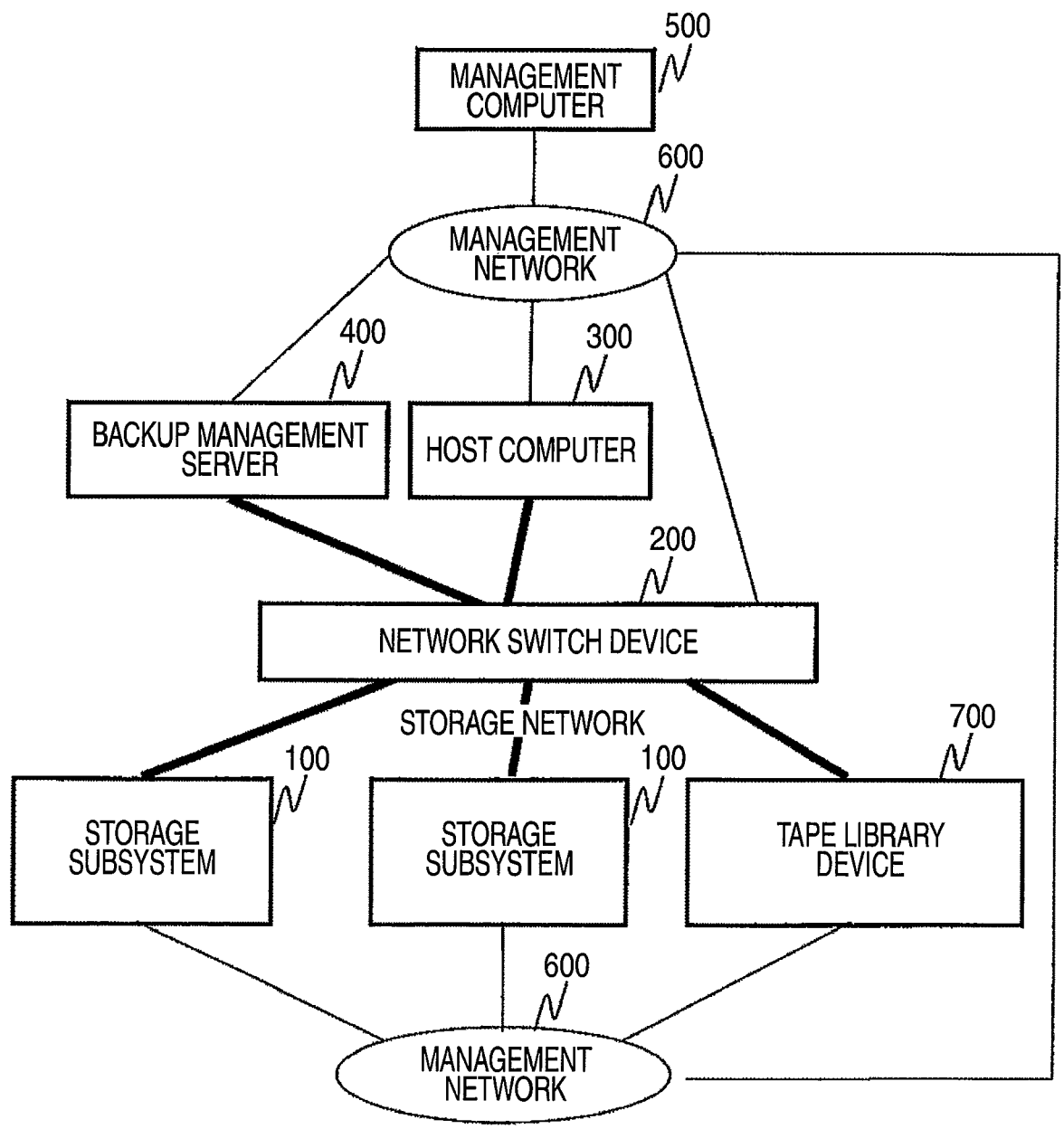
FIG. 1 is a diagram showing a storage network in an embodiment of a first example of the invention.

FIG. 1 shows the configuration in which components are connected over a network.

A host computer 300 and a storage subsystem 100 are connected together over a storage area network and via a network switch 200. The host computer 300 starts an application such as database and file server, and performs data input/output to/from storage areas. The storage subsystem 100 is mounted with a hard disk, and provides a logical storage area being an area unit for data storage. The host computer 300 and the storage subsystem 100 perform data transmission and reception therebetween over the network. A backup management server 400 is connected also to the storage subsystem 100 similarly over the storage area network and via the network switch 200. The backup management server 400 is in charge of backup copy management. The backup management server 400 and the storage subsystem 100 perform data transmission and reception therebetween over the network. These components, i.e., the storage subsystem 100, the network switch 200, the host computer 300, the backup management server 400, and a virtual tape library device 700, are connected to a management computer 500 over a management network 600. In this example, the management network 600 is provided separately from the network configured by the storage area network and the network switch 200. This is surely not restrictive, and a single network may serve as these two networks.

Figure 2:
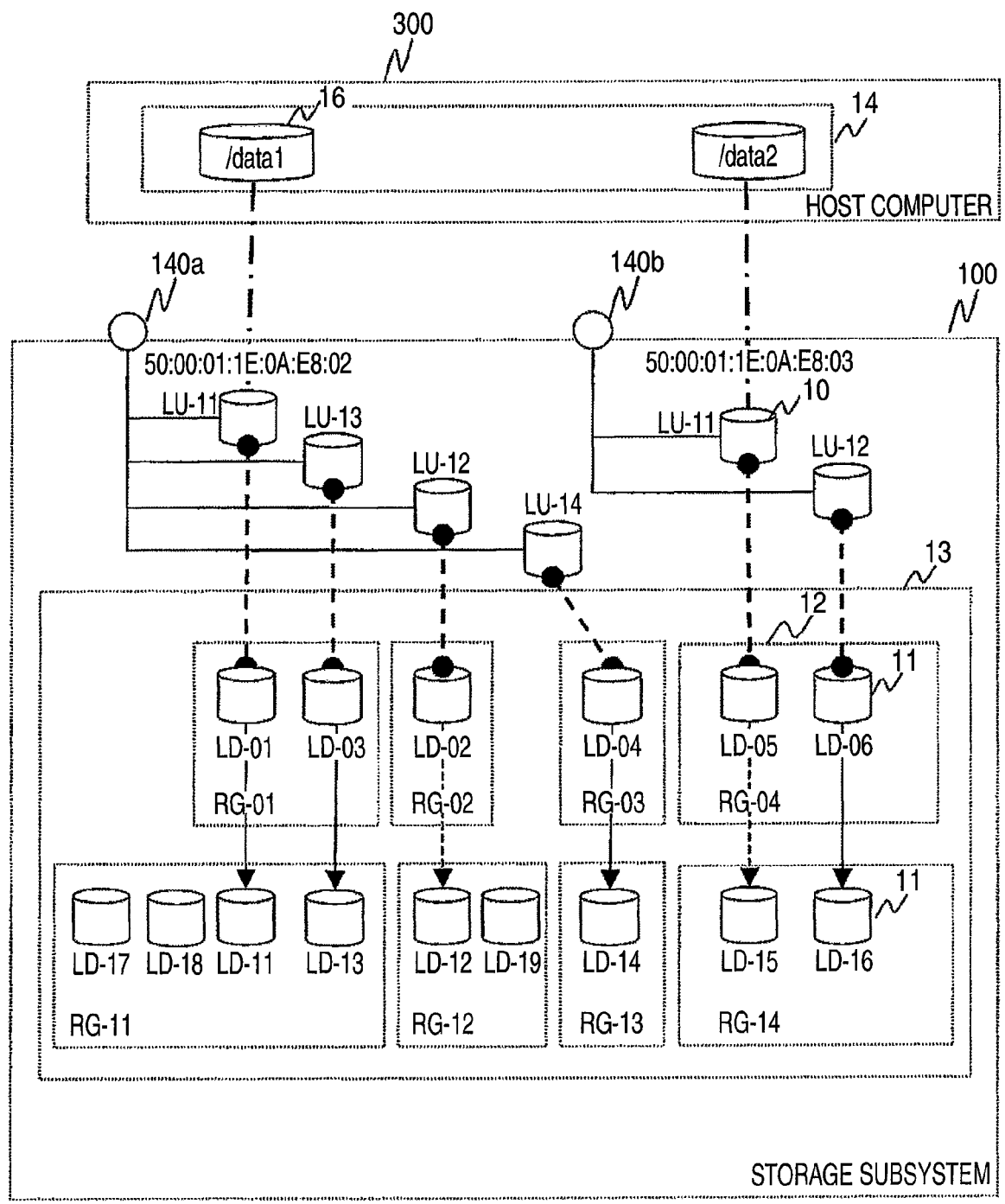
FIG. 2 is a diagram showing the storage configuration in the embodiment of the first example of the invention.

FIG. 2 shows the host computer and the storage device each in an exemplary configuration. In the storage subsystem 100, a plurality of RAID groups 12 are each configured by a plurality of storage devices. The RAID groups 12 each include a logical storage area(s) 11. For example, the RAID group "RG-01" is defined with the logical storage areas "LD-01" and "LD-03". Such logical storage areas 11 are each correlated with a storage unit 10. In this example, the storage unit "LU-11" of a data input/output communications interface "50:00:01:1E:0A:E8:02" is correlated with the logical storage area "LD-01". The storage unit 10 is also correlated with a host computer storage volume 16 on the host computer 300. In this example, the storage unit "LU-11" of the data input/output communications interface "50:00:01:1E:0A:E8:02" is correlated with the host computer storage volume "/data1".

The logical storage areas 11 are each defined with a primary logical storage area, and a secondary logical storage area. The primary logical storage area is generally defined with an LU (Logical Unit) path, and the secondary logical storage area is written with a copy of data of the primary logical storage area at the time of backup. In this example, the primary logical storage areas include "LD-01", "LD-02", "LD-03", "LD-04", "LD-05", and "LD-06", and the secondary logical storage areas correlated thereto are "LD-11", "LD-12", "LD-13", "LD-14", "LD-15", and "LD-16", respectively.

A service group 14 is configured by at least one or more storage volumes 16. For example, the service group "APP1" is configured by the storage volumes "/data1" and "/data2". As described above, the storage volume(s) 16 configuring the service group 14 are each correlated with the logical storage unit 10. The logical units 10 are each correlated with the primary logical storage areas 11. The data stored in the primary logical storage areas 11 is copied and directed to the respectively corresponding secondary logical storage areas 11, which are each correlated with the service group 14, thereby defining a copy group 13. As an example, a copy group is defined as below with respect to the host computer storage volumes "/data1" and "/data2" configuring the service group "APP1". In the copy group, the logical storage areas correlated to the storage volume "/data1" are "LD-01", "LD-02", "LD-03", and "LD-04". Similarly, the logical storage areas correlated to the storage volume "/data2" are "LD-05", and "LD-06". The logical storage areas serving as the copy destinations for such logical storage areas, i.e., "LD-11", "LD-12", "LD-13", "LD-14", "LD-15", and "LD-16", are defined as the same copy group 1. That is, the secondary logical storage areas of the storage volumes configuring the service group form a copy group.

Note that, in this embodiment, the storage devices configuring each of the RAID groups are operated in a power saving mode when not in use. The power saving mode varies in type depending on the level of the power saving function, e.g., cutting off the power supply to a chassis carrying therein a plurality of storage devices, cutting off the power supply to the storage devices, and stopping rotation of disks of the storage devices. In the below, the power saving mode in this embodiment is exemplarily of cutting off the power supply to the storage devices, but this is surely not restrictive. In the ready mode, input/output to the storage devices is possible.

During normal operation, the RAID groups "RG-11", "RG-12", "RG-13", and "RG-14" are in the power saving mode, and are in the ready mode only at the time of backup. The RAID groups here are those correlated with the secondary logical storage areas "LD-11", "LD-12", "LD-13", "LD-14", "LD-15", "LD-16", "LD-17", and "LD-18", respectively.

In this embodiment, the RAID groups are entirely or partially the logical storage areas, and the logical storage areas and the logical storage units are correlated with each other. This is surely not restrictive, and alternatively, the RAID groups may be entirely or partially the logical storage units.

Figure 3:
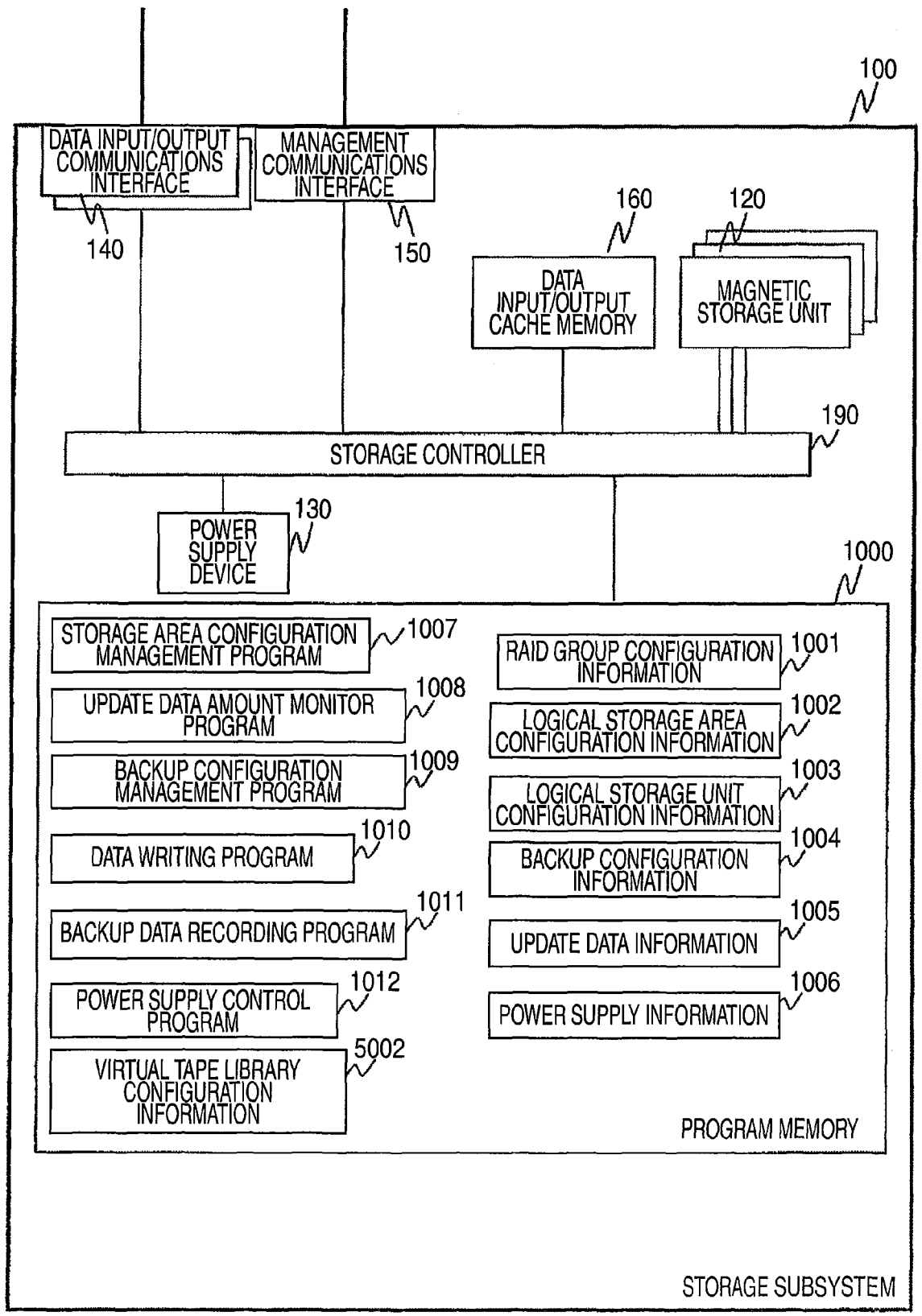
FIG. 3 is a diagram showing a storage subsystem in the embodiment of the first example of the invention.

FIG. 3 shows an exemplary configuration of the storage subsystem 100. The storage subsystem 100 is configured to include a data input/output communications interface 140, a management communications interface 150, a program memory 1000, a data input/output cache memory 160, a magnetic disk drive 120, a power supply device 130, and a storage controller 190. The data input/output communications interface 140 is connected to the network switch 200 over the storage area network, and performs data input/output. The management communications interface 150 is connected to the management network, and serves to perform input/output of management information to/from a management computer. The program memory 1000 stores any programs needed to operate the storage subsystem 100. The data input/output cache memory 160 is a temporary storage area for higher-speed input/output by the host computer 300 to/from the storage area. The magnetic disk drive 120 stores therein data, and the power supply device 130 makes a power supply to the storage subsystem. These components of the storage subsystem 100 are each connected to the storage controller 190 carrying a processor for controlling the components.

The data input/output communications interface 140 and the management communications interface 150 may be implemented by a network input/output device such as fiber channel and Ethernet™. Note that, in this example, the data input/output communications interface 140 and the management communications interfaces 150 are not specifically limited in number. Moreover, the data input/output communications interface 140 and the management communications interface 150 may be provided to each different device, or alternatively, a single interface may be provided with the functions of the data input/output communications interface 140 and those of the management communications interfaces 150.

The data input/output cache memory 160 is generally implemented by a volatile memory, but a nonvolatile memory or a magnetic storage device will also do. In the embodiment of the invention, the data input/output cache memory 160 is not limited in number and capacity.

The program memory 1000 is implemented by a magnetic storage device and a volatile semiconductor memory, and stores a basic program and information needed to operate the storage subsystem 100. The program memory 1000 also stores control programs and control information of the storage subsystem 100. The program memory includes RAID group configuration information 1001, logical storage area configuration information 1002, logical storage unit configuration information 1003, backup configuration information 1004, update data information 1005, power supply information 1006, a storage area configuration management program 1007, an update data amount monitor program 1008, a backup configuration management program 1009, a data writing program 1010, a backup data recording program 1011, a power supply control program 1012, and virtual tape library configuration information 5002. The control information 1001 to 1006 will be described in detail below by referring to the accompanying drawings.

The storage area configuration management program 1007 manages the attributes of the logical storage units 10 and those of the logical storage areas 11. The storage area configuration management program 1007 defines an LU path with respect to a command coming from the host, and controls the correlation between the logical storage areas 11 and the storage units 10.

The update data amount monitor program 1008 monitors the backup primary logical storage areas 11 in terms of the amount of update data coming from the host computer 300, and manages the update data information 1005.

The backup configuration management program 1009 controls the correlation between the primary logical storage areas 11 and the secondary logical storage areas 11 for backup data.

The data writing program 1010 is for data writing through selection of the logical storage areas 11.

The backup data recording program 1011 reads backup data of the primary logical storage areas 11, and copies the backup data to the secondary logical storage areas 11.

The power supply control program 1012 is for controlling the power supply of the power supply device 130.

Figure 4:
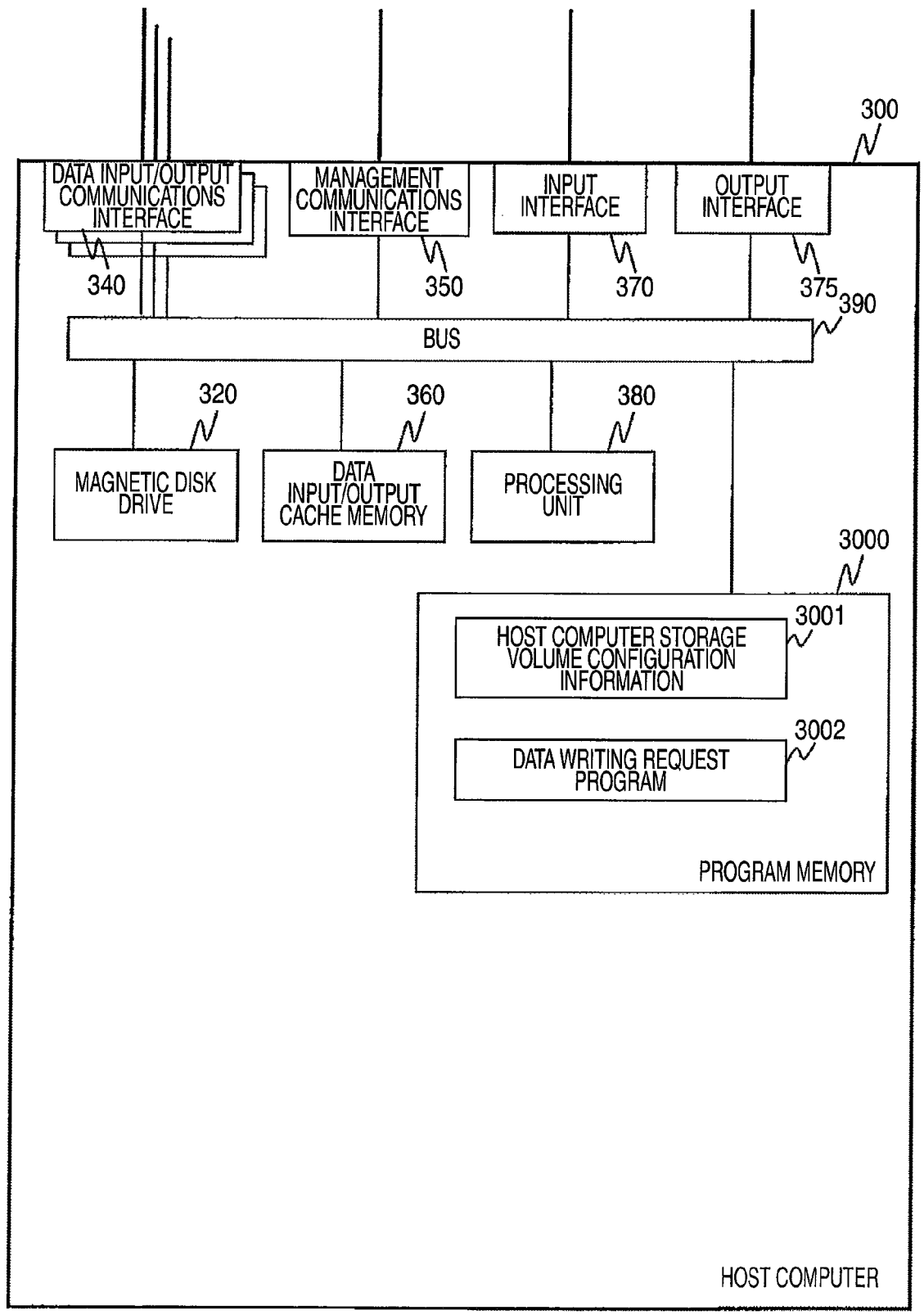
FIG. 4 is a diagram showing a host computer in the embodiment of the first example of the invention.

FIG. 4 shows an exemplary configuration of the host computer 300. The host computer 300 is configured to include a data input/output communications interface 340, a management communications interface 350, an input interface 370, an output interface 375, a processing unit 380, a magnetic disk drive 320, a program memory 3000, a data input/output cache memory 360, and a communications bus 390. The data input/output communications interface 340 is connected to the network switch 200 over the storage area network, and serves to perform data input/output. The management communications interface 350 is connected to the management network 600, and serves to input/output management information to/from the management computer. The input interface 370 is connected to a keyboard, a mouse, and others, for information input by an operator. The output interface 375 is connected to a general-purpose display or others for information output to the operator. The processing unit 380 corresponds to a CPU (Central Processing Unit) performing various calculations. The magnetic disk drive 320 stores therein basic software such as operating system and applications. The program memory 3000 stores therein any programs needed to operate the host computer 300. The data input/output cache memory 360 is a volatile memory, for example, and is used for increasing the speed of data input/output. These components are connected to one another via the communications bus 390. That is, the hardware configuration of such a host computer 300 of FIG. 4 can be implemented by a general-purpose computer (PC).

The data input/output communications interface 140 and the management communications interface 150 are each a network input/output device such as fiber channel and Ethernet™. Note that, in this example, the data input/output communications interface 140 and the management communications interface 150 are not specifically limited in number. Moreover, the data input/output communications interface 140 and the management communications interface 150 may be provided to each different device, or alternatively, a single interface may be provided with the functions of the data input/output communications interface 140 and those of the management communications interfaces 150.

The data input/output cache memory 360 is generally implemented by a volatile memory, but a nonvolatile memory or a magnetic storage device will also do. In the embodiment of the invention, the data input/output cache memory 360 is not limited in number and capacity.

The program memory 3000 is implemented by a magnetic storage device and a volatile semiconductor memory, and stores a basic program and information needed to operate the host computer 300. The program memory 3000 also stores control programs and control information, including host computer storage volume configuration information 3001 and a data writing request program 3002. The host computer storage volume configuration information 3001 will be described in detail later.

The data writing request program 3002 determines any of the host computer volumes 16 for use as a writing target, and forwards a writing request message to the communications interface 140 and the storage units 10 in the storage subsystem 100 correlated thereto.

Figure 5:
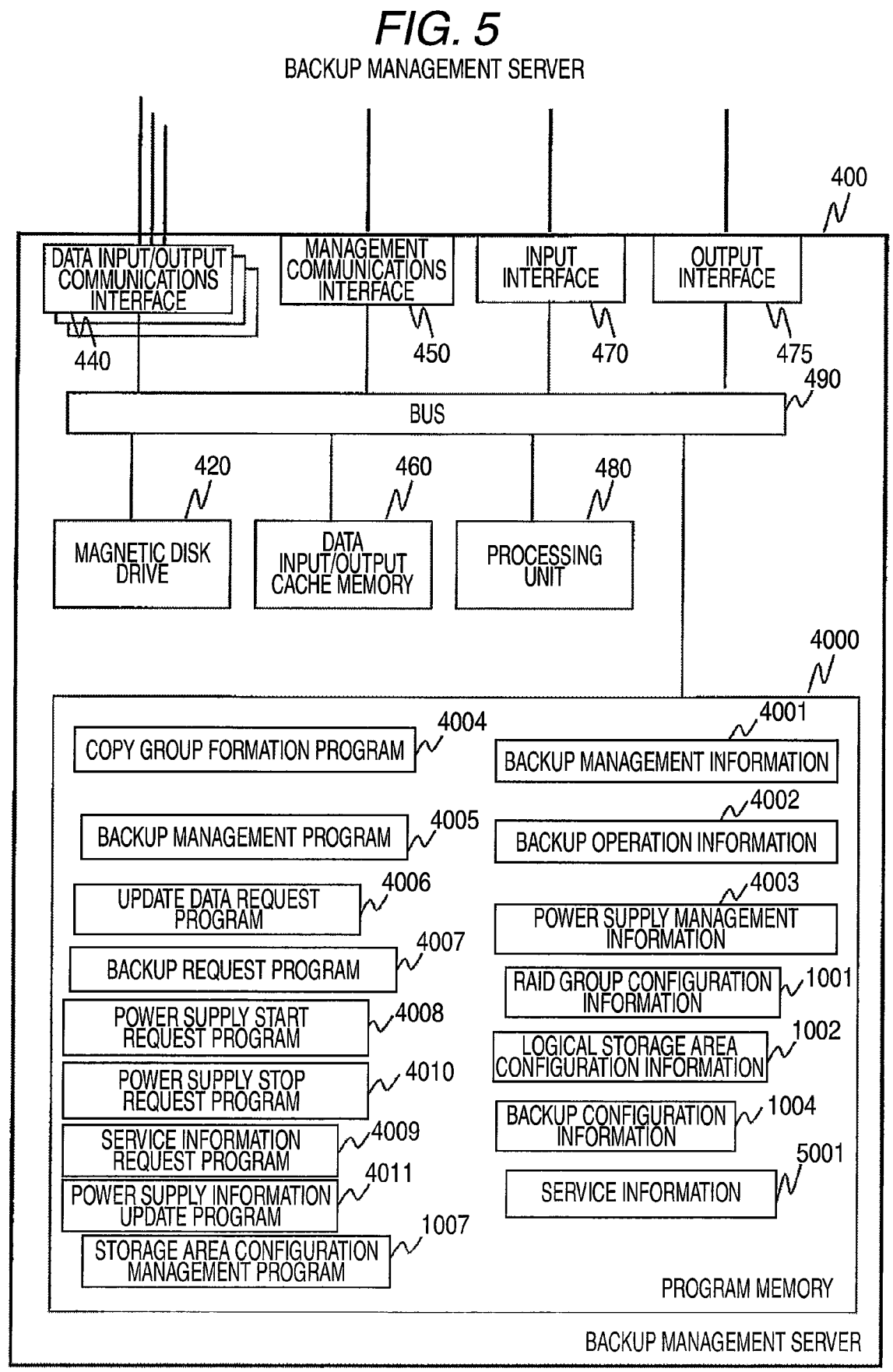
FIG. 5 is a diagram showing a backup management server in the embodiment of the first example of the invention.

FIG. 5 shows an exemplary configuration of the backup management server 400. The backup management server 400 is configured to include a data input/output communications interface 440, a management communications interface 450, an input interface 470, an output interface 475, a processing unit 480, a magnetic disk drive 420, a program memory 4000, a data input/output cache memory 460, and a communications bus 490. The data input/output communications interface 440 is connected to the network switch 200 over the storage area network, and serves to perform data input/output. The management communications interface 450 is connected to the management network 600, and serves to input/output management information to/from the management computer. The input interface 470 is connected to a keyboard, a mouse, and others, for information input by an operator. The output interface 475 is connected to a general-purpose display or others for information output to the operator. The processing unit 480 corresponds to a CPU performing various calculations. The magnetic disk drive 420 stores therein basic software such as operating system and applications. The program memory 4000 stores therein any programs needed to operate the backup management server 400. The data input/output cache memory 460 is a volatile memory, for example, and is used for increasing the speed of data input/output. These components are connected to one another via the communications bus 490. That is, the hardware configuration of such a backup management server 400 of this example can be implemented by a general-purpose computer (PC).

The data input/output communications interface 140 and the management communications interface 150 are each a network input/output device such as fiber channel and Ethernet™. Note that, in this embodiment of the invention, the data input/output communications interface 140 and the management communications interface 150 are not specifically limited in number. Moreover, the data input/output communications interface 140 and the management communications interfaces 150 may be provided to each different device, or alternatively, a single interface may be provided with the functions of the data input/output communications interface 140 and those of the management communications interfaces 150.

The data input/output cache memory 460 is generally implemented by a volatile memory, but a nonvolatile memory or a magnetic storage device will also do. In the embodiment of the invention, the data input/output cache memory 460 is not limited in number and capacity.

The program memory 4000 is implemented by a magnetic storage device and a volatile semiconductor memory, and stores a basic program and information needed to operate the backup management server 400. The program memory 4000 also stores control programs and control information, including backup management information 4001, backup operation information 4002, power supply management information 4003, service information 5001, the RAID group configuration information 1001, the logical storage area configuration information 1002, the backup configuration information 1004, service information 5001, a copy group formation program 4004, a backup management program 4005, an update data request program 4006, a backup request program 4007, a power supply start request program 4008, a service information request program 4009, a power supply stop request program 4010, a power supply information update program 4011, and the storage area configuration management program 1007.

The copy group formation program 4004 receives the service information from the management computer, and collectively groups a plurality of logical storage areas 11 for backup on a service basis.

The backup management program 4005 manages, in the backup management information 4001 and the backup operation information 4002, the backup schedule such as copy time, copy order, copy state, and others.

The update data request program 4006 asks the storage subsystem 100 for update data information.

The backup request program 4007 asks the storage subsystem 100 for backup copy.

The power supply start request program 4008 makes a determination, e.g., any of the RAID groups 12 with no update data is not a target for power supply, and forwards a request to the management computer 500 for providing a power supply start command to the storage subsystem 100.

The service information request program 4009 asks the management computer 500 for the service information 5001.

The power supply stop request program 4010 forwards a request to the management computer 500 to provide a power supply stop command to the storage subsystem 100.

The power supply information update program 4011 acquires power supply information from the storage subsystem 100, and updates the power supply management information 4003 in the backup management server 400.

Figure 6:
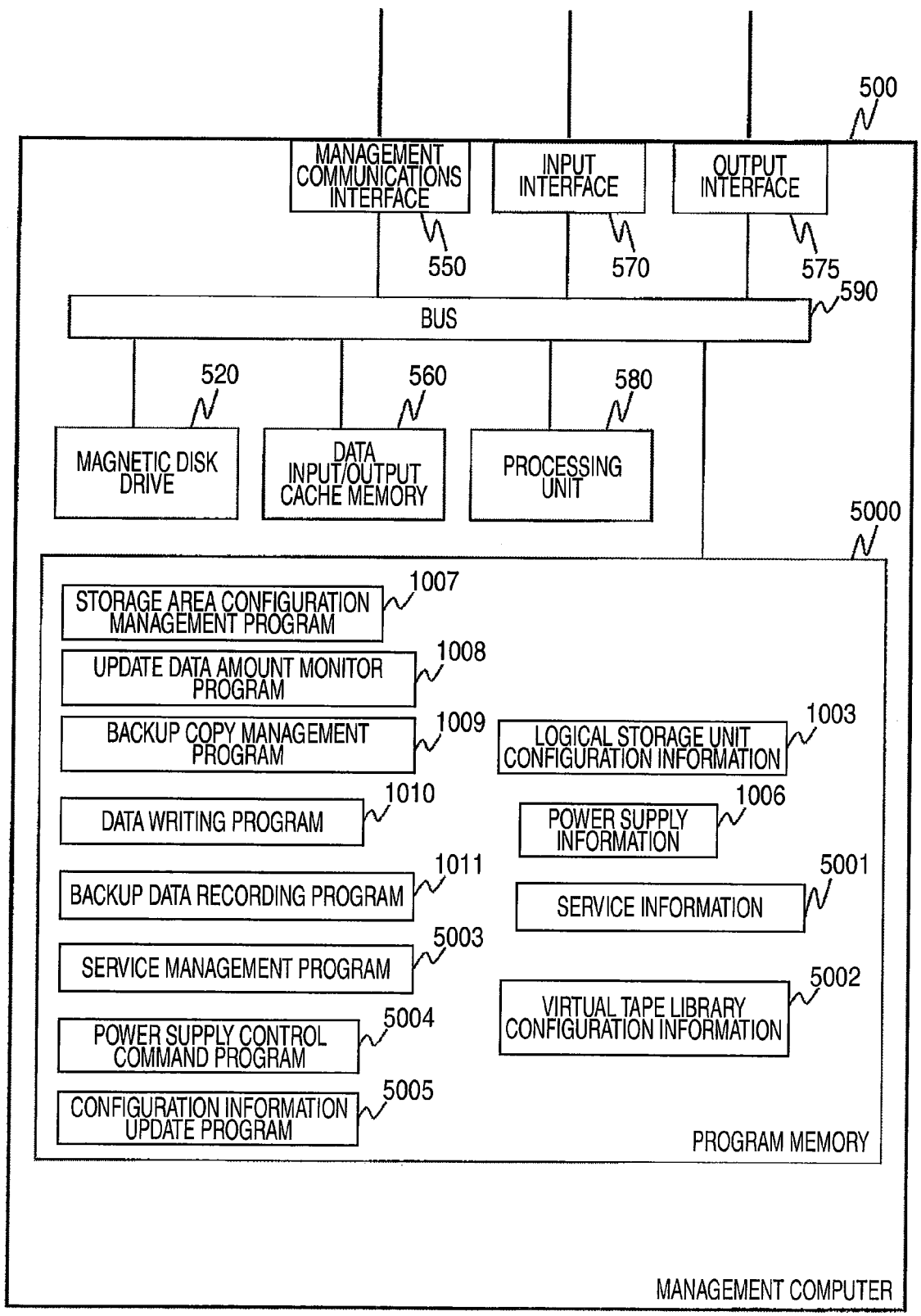
FIG. 6 is a diagram showing a management computer in the embodiment of the first example of the invention.

FIG. 6 shows an exemplary configuration of the management computer 500. The management computer 500 is configured to include a management communications interface 550, an input interface 570, an output interface 575, a processing unit 580, a magnetic disk drive 520, a program memory 5000, and a communications bus 590. The management communications interface 550 is connected to the management network 600, and serves input/output of management information. The input interface 570 is connected to a keyboard, a mouse, and others, for information input by an operator. The output interface 575 is connected to a general-purpose display or others for information output to the operator. The processing unit 580 corresponds to a CPU performing various calculations. The magnetic disk drive 520 stores therein basic software such as operating system and applications. The program memory 5000 stores programs needed to operate the management computer 500. These components are connected to one another via the communications bus 590. That is, the hardware configuration of such a management computer 500 of this example can be implemented by a general-purpose computer (PC).

The program memory 5000 is implemented by a magnetic storage device and a volatile semiconductor memory, and stores a basic program and information needed to operate the management computer 500. The program memory 5000 also stores control programs and control information, including the logical storage unit configuration information 1003, the power supply information 1006, service information 5001, the storage area configuration management program 1007, the update data amount monitor program 1008, the backup copy management program 1009, the data writing program 1010, the backup data storage program 1011, the virtual tape library configuration information 5002, a service management program 5003, a power supply control command program 5004, and a configuration information update program 5005.

The service management program 5003 controls the correlation between the service groups 14 and the logical storage areas 11.

The power supply control command program 5004 issues a command to the storage subsystem 100 for starting or stopping a power supply.

The configuration information update program 5005 forwards an update information transmission request to the storage subsystem 100, and updates the configuration information thus provided by the storage subsystem 100.

Herein, the backup management server 400 and the management computer 500 may be the same computer. As such, exemplified below is a case where the backup management server and the management computer are configured separately from each other, but this is surely not restrictive, and may be configured as the same computer.

FIG. 7 shows an exemplary configuration of the RAID group configuration information 1001 to be stored in the program memory 1000 of the storage subsystem 100. The RAID groups 12 recorded in RAID group identification information 10011 are each configured by a plurality of magnetic disk drive s 120 recorded in magnetic disk drive identification information 10013. The magnetic disk drive s 120 configuring each of the RAID groups 12 are each a unit configuring a RAID (Redundant Array of Independent Disks). The storage capacity of each of the RAID groups are recorded in storage area capacity information 10012. The storage capacity to be recorded here is not the sum of the physical capacity of the magnetic disk drive s 120 recorded in the magnetic disk drive identification information 10013 but the logical effective storage capacity available for data recording in the RAID configuration. Assuming that the RAID configuration is 3D+1P, i.e., ¼ of the physical storage capacity is to be consumed by recording of parity data, the effective storage capacity will be equal to the remaining, i.e., ¾.

FIG. 8 shows an exemplary configuration of the data storage area configuration information 1002 to be stored in the program memory 1000 of the storage subsystem 100. The logical storage areas 11 recorded in storage area identification information 10021 are information for use to identify any logical storage area included in each of the RAID groups 12. The physical positions of the logical storage areas 11 are each specified by a physical address on the RAID group 12 recorded at a start block address 10023 and an end block address 10024.

FIG. 9 shows an exemplary configuration of the logical storage unit configuration information 1003 to be stored in the program memory 1000 of the storage subsystem 100. The storage areas recorded in logical storage area identification information 10033 are each correlated to the identification information recorded in the data input/output communications interface in communications interface identification information 10031, and the logical storage units 10 recorded in logical storage unit identification information 10032. The logical storage unit 10 is a storage resource unit accessible by the host computer 300 connected to the storage subsystem 100, and is a volume to be mounted to a file system operated by the host computer 300.

FIG. 10 shows an exemplary configuration of the backup configuration information 1004 to be stored in the program memory 1000 of the storage subsystem 100. In the backup configuration information 1004, the data of the logical storage areas recorded in primary logical storage area identification information 10041 are respectively correlated to the logical storage areas recorded in secondary logical storage area identification information 10042.

FIG. 11 shows an exemplary configuration of the update data information 1005 to be stored in the program memory 1000 of the storage subsystem 100. When the host computer 300 performs writing to any of the logical storage areas recorded in logical storage area identification information 10051, the time of writing is written in an update time 10053 for the logical storage area to be the latest. The amount of data thus written in the logical storage area is added to a value in an update data amount 10054. That is, recorded in the update data amount 10054 is the sum of the amount of data written by the host computer 300 to the logical storage area from the time in a monitor start time 10052 to the time in the update time 10053. The timing for updating the value in the monitor start time 10052 will be described later.

FIG. 12 shows an exemplary configuration of the power supply information 1006 to be stored in the program memory 1000 of the storage subsystem 100. When the RAID groups 12 recorded in RAID group identification information 10061 are receiving a power supply from the power supply device 130, a power supply state 10062 is recorded with "ON". On the other hand, when such RAID groups are not receiving a power supply, the power supply state 10062 is recorded with "OFF".

FIG. 13 shows exemplary backup management information 4001 to be stored in the program memory 4000 of the backup management server 400. A copy group number 40011 is used to identify a copy group being a unit for execution of backup, and using this unit, data backup is performed from the logical storage areas recorded in primary logical storage area identification information 40012 to the logical storage areas recorded in secondary logical storage area 40013. An update stop time 40014 is recorded with the time for stopping data update by the host computer 300 to the logical storage areas 11 for execution of backup, and a copy start time 40014 is recorded with the time for starting backup.

FIG. 14 shows exemplary backup operation information 4002 to be stored in the program memory 4000 of the backup management server 400. The backup operation information 4002 manages the order of execution of backup from the logical storage areas recorded in primary logical storage area identification information 40022 to the logical storage areas recorded in secondary logical storage area identification information 40023. Such order management is performed on a copy group basis recorded in a copy group number 40021. The values recorded in a copy order number 40025 indicate the execution order for copying in the copy groups, and the copy is performed in the order. A copy state 40025 indicates the execution state of copy, and when no copy is in progress, "not yet" is recorded therein, and after completion of copy, "copied" is recorded therein. An update data amount 40024 indicates the amount of updated data in the logical storage areas recorded in the primary logical storage area identification information 40022. That is, the amount of updated data indicates the amount of data being a target of backup copy. As such, when this value is zero, no copy is performed so that the copy order number 40025 in the line recorded with "0 GB" for the update data amount 40024 is recorded with "Null". In the copy order number 40025, assignment of numbers is performed in such a manner that, through reference to the logical storage area configuration information 1002, the logical storage areas belonging to the same RAID group are numbered consecutively in the secondary logical storage area 40023. By setting the copy order as such, the same RAID group can be subjected to copying in a sequential manner. This accordingly prevents, during the backup process for any one specific copy group, copying into any same RAID group for a plurality of times at established intervals. Accordingly, after completion of copying to any one specific RAID group, when the RAID group is changed in mode to power saving, it is possible to prevent another mode change to the ready mode.

FIG. 15 shows an exemplary configuration of the power supply management information 4003 to be stored in the program memory 40000 of the backup management server 400. Any RAID group including the logical storage areas configuring a copy group is recorded in a copy-destination RAID group identification information 40031. An update data amount 40033 indicates the amount of data calculated for each of the RAID groups. The character string recorded in a power supply state 40034 indicates the state of power supply, and when the RAID group is receiving a power supply, "ON" is recorded therein, and when the RAID group 12 is not receiving a power supply, "OFF" is recorded therein.

FIG. 16 shows an exemplary configuration of the host computer storage area configuration information 3001 to be stored in the program memory 3000 of the host computer 300. The file system operated by the host computer 300 mounts the storage devices recorded in storage device identification information 30012 with the storage volumes 16 recorded in storage volume identification information 30011 each as a destination for mounting. Communications interface identification information 30013 stores the data input/output communications interface 140 of the storage subsystem for use by the management computer to access the storage devices. The storage units recorded in the storage unit identification information 30014 are those in the storage subsystem corresponding to the storage devices. That is, an input/output request for the storage volumes recorded in the storage volume identification information 30011 is executed with respect to the storage units 10 set to the data input/output communications interface 140 on the storage subsystem 100 connectable via the data input/output network.

FIG. 17 shows an exemplary configuration of the service information 5001 to be stored in the program memory 5000 of the management computer 500. The service information 5001 in this example uses the storage volumes 16, which are recorded in a storage volume identification information 50013 by the applications recorded in service group identification information 50012 of the host computers 300 recorded in a host name 50011. These storage volumes 16 are corresponding to the logical storage units 10 recorded in storage unit identification information 50014 of the storage subsystem 100. Herein, any same service may be executed by a plurality of host computers 300.

Figure 18:
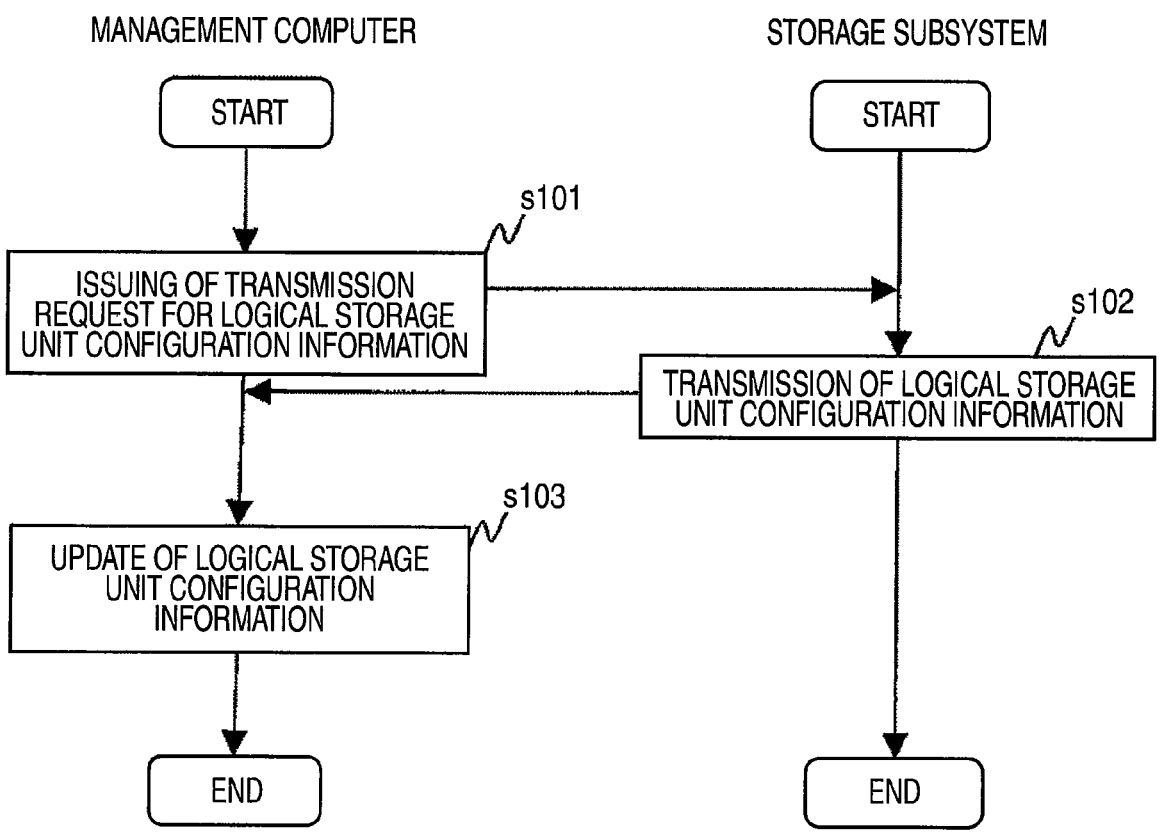
FIG. 18 is a diagram showing a logical storage unit configuration information update process in the embodiment of the first example of the invention.

FIG. 18 shows a flowchart of the procedure of a process for updating the logical storage unit configuration information 1003 to be stored in the program memory 5000 of the management computer 500. Using the configuration information update program 5005 of the management computer 500, the logical storage unit configuration information 1003 to be stored in the program memory 5000 can be updated to be the latest when the need arises.

The configuration information update program 5005 issues a logical storage unit configuration information transmission request message to the storage subsystem 100 (step s101). Herein, the following processes by the management computer 500 are entirely executed specifically by the processing unit 580. The storage subsystem 100 receives the logical storage unit configuration information transmission request, and by following the request, the storage area configuration management program 1007 forwards the logical storage unit configuration information 1003 (step s102). After receiving the logical storage unit configuration information 1003 as such, the management computer 500 updates the logical storage unit configuration information 1003 stored in the program memory 5000 (step s103).

Figure 19:
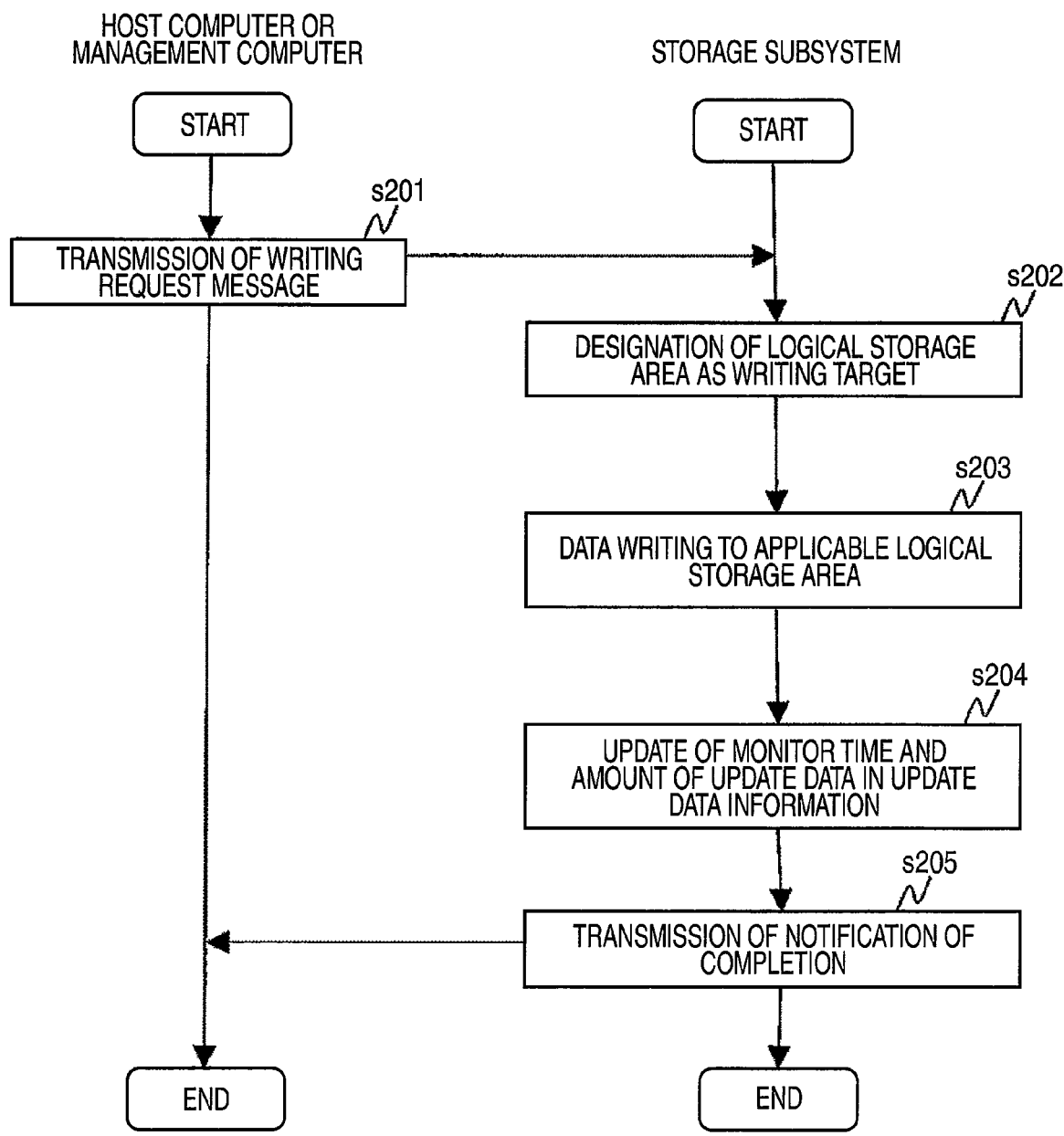
FIG. 19 is a diagram showing a writing process in the embodiment of the first example of the invention.

FIG. 19 shows the procedure of a process for data writing to the logical storage areas 11 by the storage subsystem 100. The data writing process to the logical storage areas 11 is executed by the data writing program 1010 by following a request coming from the management computer 500 or the host computer 300. The data writing program 1010 is the one stored in the program memory of the storage subsystem 100. Note that this process is not executed in a time period until the writing to the logical storage areas 11 is resumed after the writing thereto is stopped (will be described later). In this example, described below is the writing process by the host computer 300, but the writing process by the management computer 500 is similarly performed.

First of all, the data writing request program 3002 stored in the program memory of the host computer 300 refers to the storage volume identification information 30011 of the host computer storage area configuration information 3001 to select any of the host computer storage volumes 16 as a writing target. The data writing request program 3002 then forwards, via the communications interface 140, a data writing request message telling that the logical storage unit 10 corresponding to thus selected storage volume is the writing target (step s201).

In the storage subsystem 100 provided with such a data writing request message, the storage area configuration management program 1007 refers to the logical storage unit configuration information 1003 to designate any of the logical storage areas 11 corresponding to the logical storage unit as a writing destination (step s202). The data writing program 1010 then performs data recording to thus designated logical storage area 11 (step s203). The update data amount monitor program 1008 updates the values in the update data information 1005, i.e., the values in the update time 10053 and the update data amount 10054 (step s204). The storage subsystem 100 then forwards a notification of normal completion to the host computer 300 (step s205).

Figure 20:
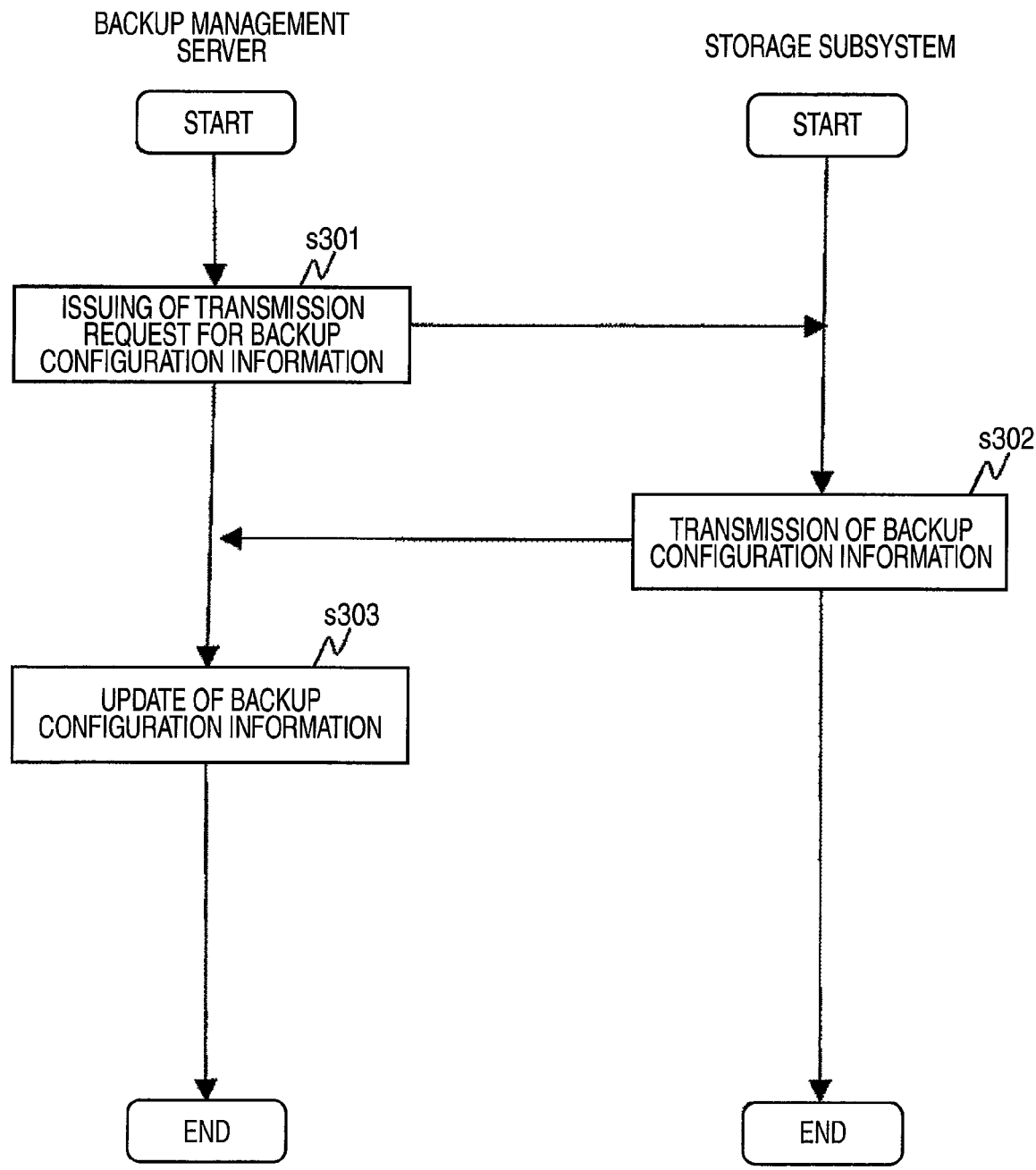
FIG. 20 is a diagram showing a backup configuration information acquisition process in the embodiment of the first example of the invention.

FIG. 20 shows the procedure of a process for the backup management server 400 to acquire information from the storage subsystem 100. The information is about the correlation between the primary logical storage areas and the secondary logical storage areas for backup.

The backup management server 400 issues a backup configuration information transmission request message to the storage subsystem 100 (step s301). This message is issued by the backup management program 4005 stored in the program memory 4000. The storage subsystem 100 is thus provided with the backup configuration information transmission request message. By following thus provided request, the backup configuration management program 1009 forwards the backup configuration information 1004 (step s302). The backup management server provided with the backup configuration information 1004 as such then updates the backup configuration information 1004 for storage in the program memory 4000 (step s303).

Figure 21:
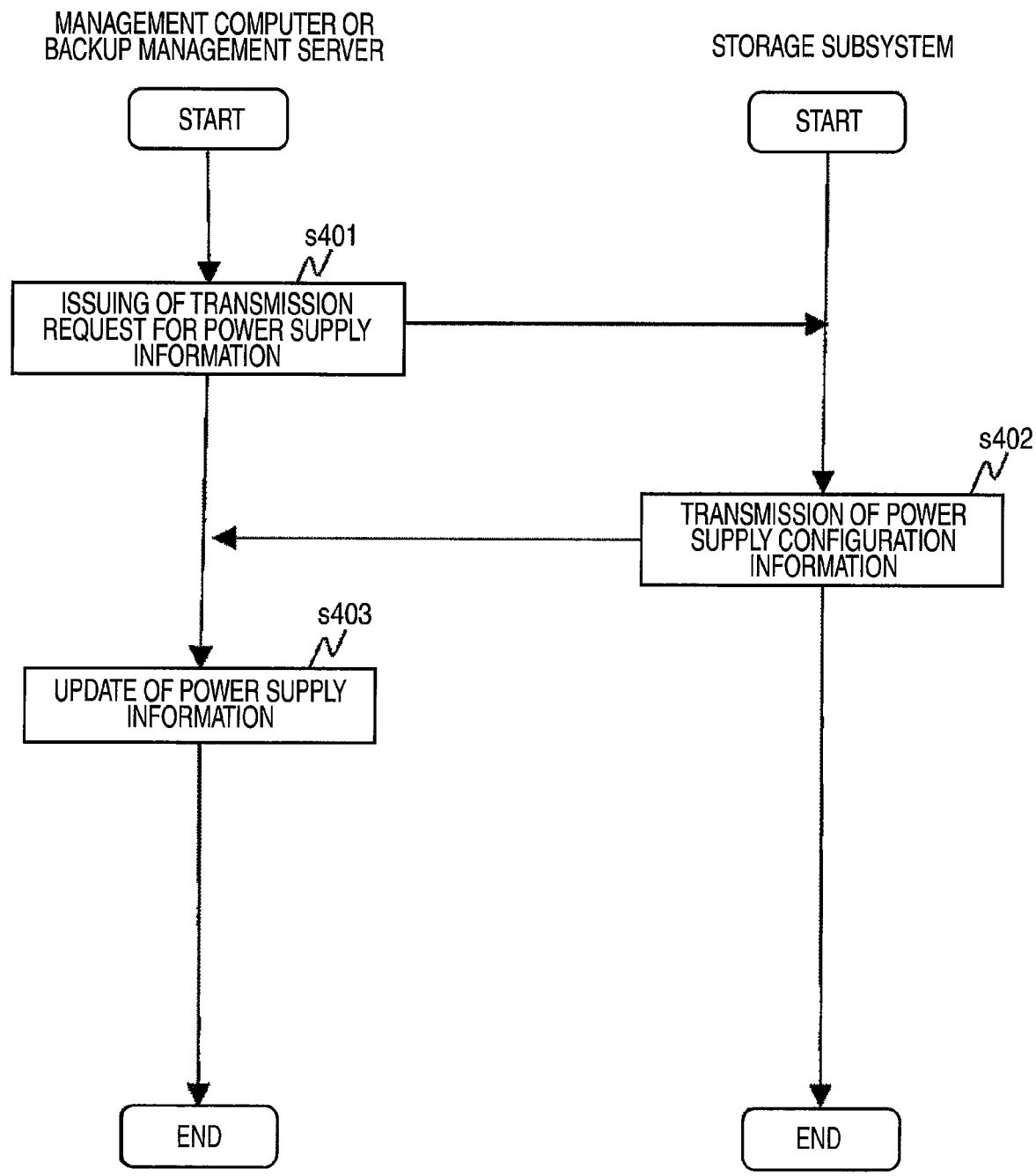
FIG. 21 is a diagram showing a power supply information acquisition process in the embodiment of the first example of the invention.

FIG. 21 shows the procedure of a process for the backup management server 400 or the management computer 500 to acquire power supply information from the storage subsystem 100. First of all, a power supply information transmission request message is issued to the storage subsystem 100 using the power supply information update program 4011 stored in the program memory of the backup management server 400 (step s401). The storage subsystem 100 is thus provided with the power supply information transmission request message. By following thus provided message, the power supply control program 1012 forwards the power supply information 1006 (step s402). The backup management server 400 or the management computer 500 provided with the power supply information 1006 as such updates the power supply management information 4003 stored in the program memory 4000 (step s403).

Figure 22:
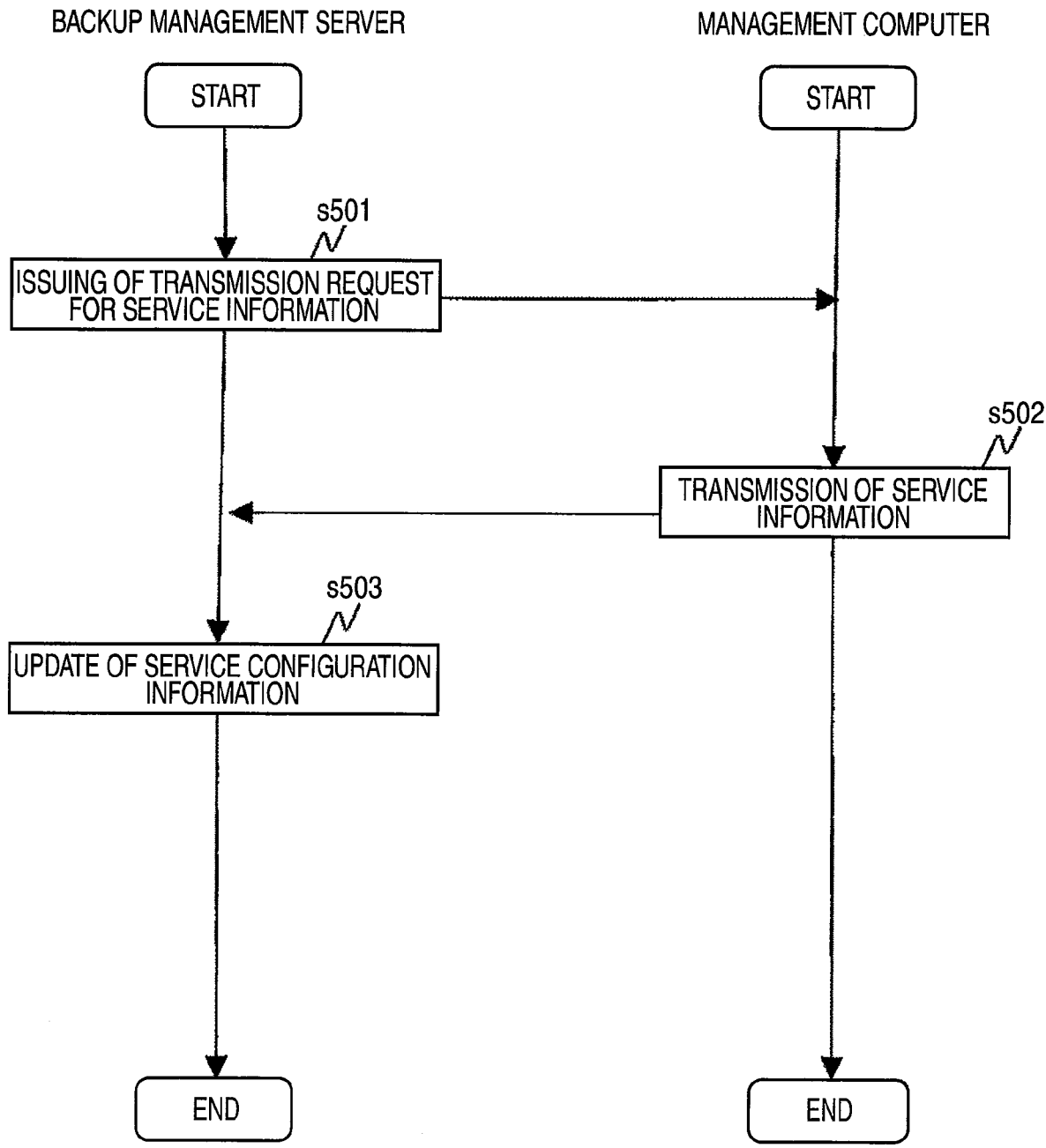
FIG. 22 is a diagram showing a service information acquisition process in the embodiment of the first example of the invention.

FIG. 22 shows the procedure of a process for the backup management server 400 to acquire service information from the management computer 300. The backup management server 400 forwards a service information transmission request message to the management computer 500 using the service information request program 4009 stored in the program memory 4000 (step s501). The management computer 500 receives the service information transmission request message, and by following the request, the service management program 5003 forwards the service information 5001 (step s502). The backup management server 400 thus provided with the service information 5001 updates the service information 5001 stored in the program memory 4000 (step s503).

Herein, in the backup management server 400, various types of information are created at the timing of updating the service information 5001, i.e., the backup management information 4001, the backup operation information 4002, and the power supply management information 4003. Such information is created, by the copy group formation program 4004, in the order of the backup management information 4001, the backup operation information 4002, and the power supply management information 4003.

To be specific, for creating the backup management information 4001 and the backup operation information 4002, through reference to the logical storage unit configuration information 1003, a correlation is established between the logical storage units 10 and the primary logical storage areas 11. The logical storage units 10 are those found in the logical storage unit identification information 50014 of the service information 5001. Thereafter, by referring to the backup configuration information 1004, the primary logical storage areas 10041 and the secondary logical storage areas 10042 are stored in pairs. For storing the resulting pairs of the primary logical storage areas 10041 and the secondary logical storage areas 10042, assignment of copy group numbers is performed thereto with a correlation to the service group identification information 50012, and the pairs are grouped according to the copy group number. For such assignment of copy group numbers, specifically, the service group number 14 is assigned "APP1", and the copy group number 13 is assigned "1". Herein, in the backup operation information 4002, as for the initial values in each line, the update data amount 40024 shows "0 GB", the copy order number 40025 shows "Null", and the copy state 40026 shows "not yet".

For creating the power supply management information 4003, a correlation is established between the secondary logical storage areas 40013 in the backup management information 4001 and the logical storage areas 11 recorded in the logical storage area identification information 10021 of the logical storage area configuration information 1002, thereby specifying the RAID group including the secondary logical storage area(s). Thereafter, for use in the copy-destination RAID group identification information 40032, the RAID group 12 is designated and then stored.

Figure 23:
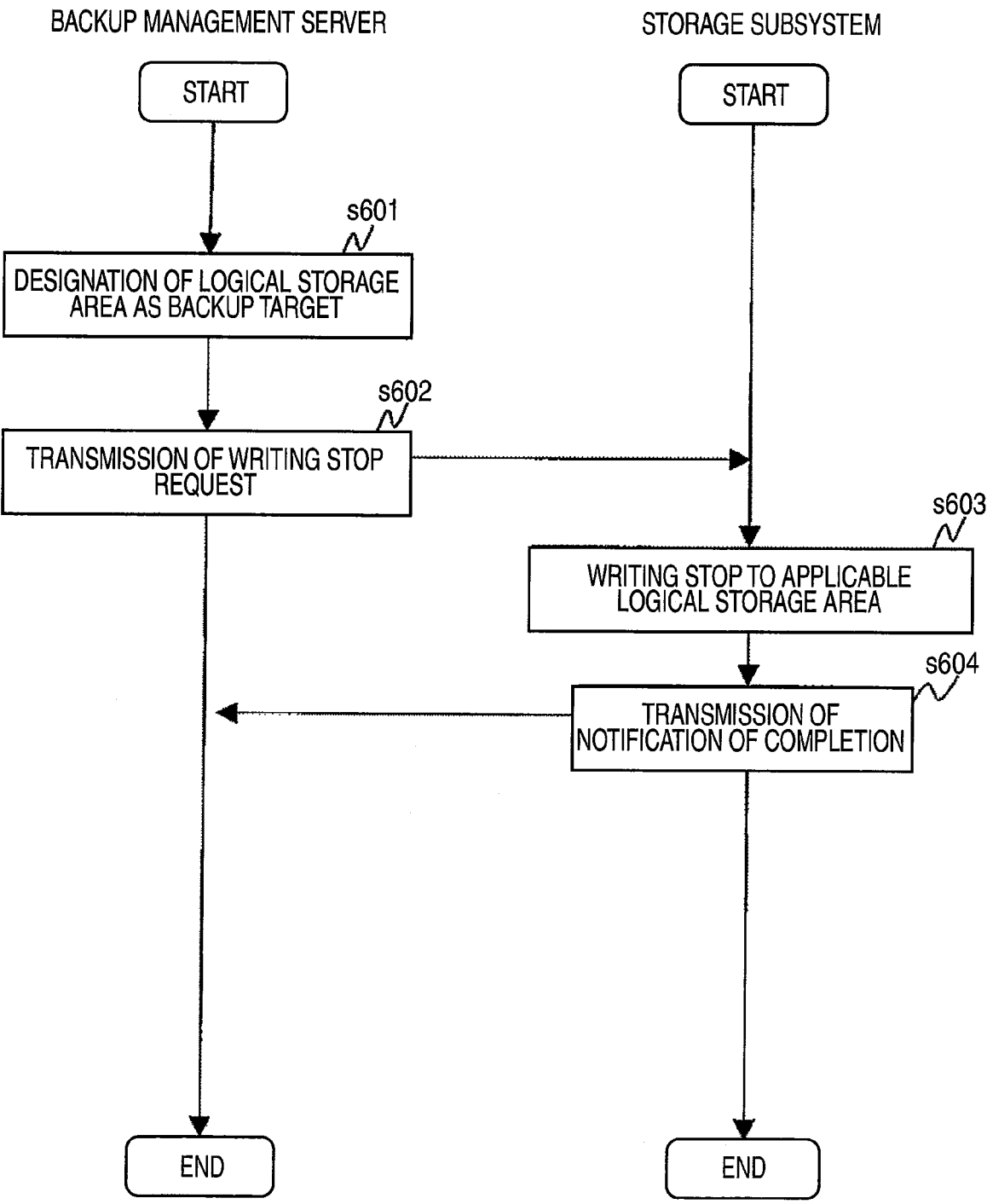
FIG. 23 is a diagram partially showing a backup setup process in the embodiment of the first example of the invention.

FIG. 23 shows the procedure of a process for stopping writing to the primary logical storage areas before execution of backup. This process is executed at the time recorded in the update stop time 40014 in the backup management information 4001 (FIG. 13).

The backup management server 400 refers to the backup management information 4001 using the backup management program 4005 stored in the program memory, and designates any of the logical storage areas 11 recorded in the primary logical storage area 40012 corresponding to the copy group number 40011 being a backup target (step s601). The backup management program 4005 stored in the program memory of the backup management server 400 forwards, to the storage subsystem 100, a request message asking to stop the wiring to the logical storage area 11 designated in step s601 (step s602). The storage subsystem 100 thus provided with the writing stop request message accordingly stops the writing to the logical storage area 11 using the data writing program 1010 (step s603). The storage subsystem 100 then forwards a notification of normal completion to the backup management server 400 (step s604).

Figure 24:
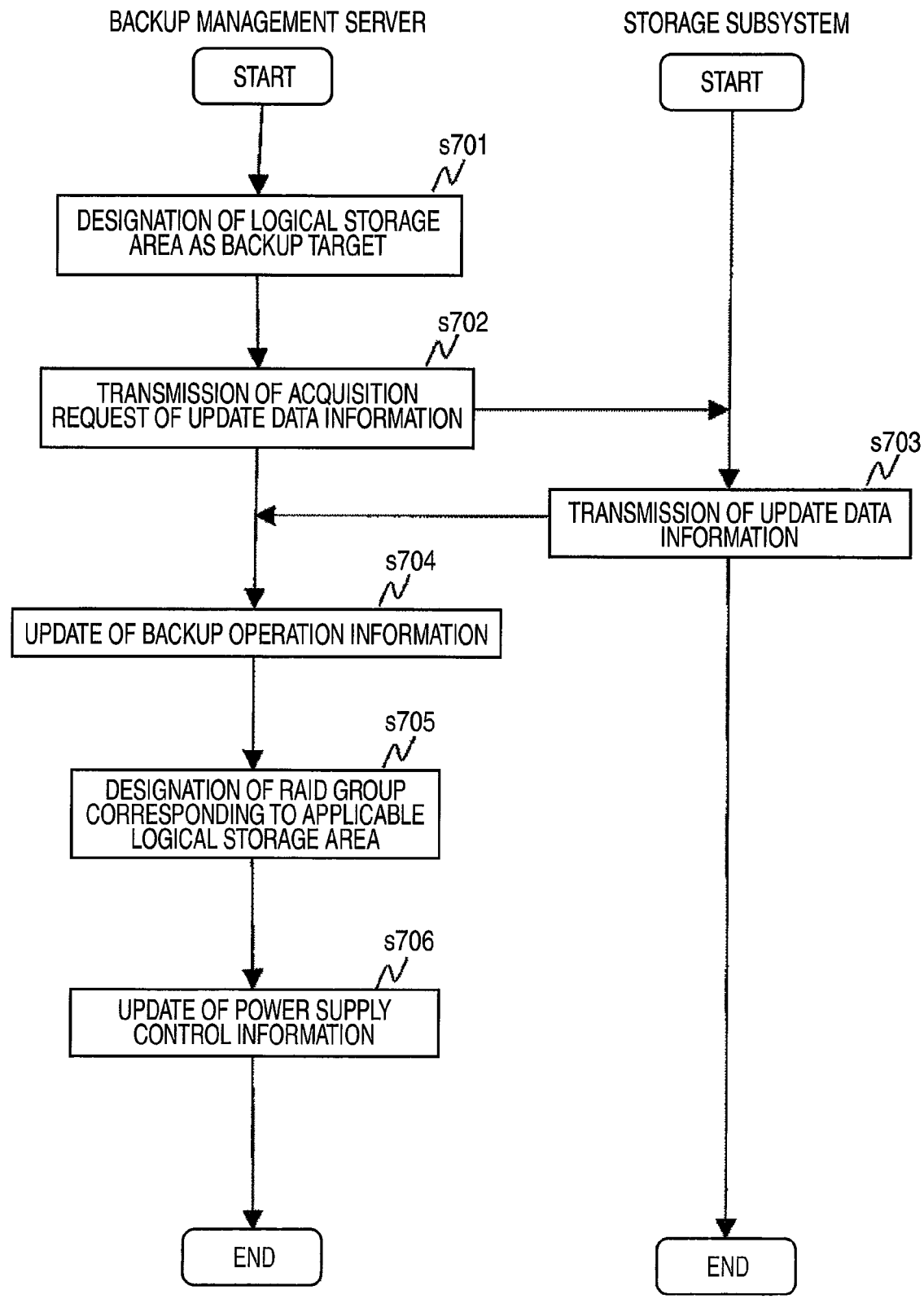
FIG. 24 is another diagram partially showing the backup setup process in the embodiment of the first example of the invention.

FIG. 24 shows the procedure of a process for the backup management server 400 to acquire update data information from the storage subsystem 100 before execution of backup. This process is executed in the backup management server 400 in response to when the notification of completion of step s604 is provided.

The backup management server 400 refers to the backup management information 4001 using the backup management program 4005 stored in the program memory, and designates any of the logical storage areas 11 under the same copy group number 40011 selected as the backup target (step s701). Using the update data request program 4005 stored in the program memory, the backup management server 400 forwards a request message to the storage subsystem 100 to transmit the update data amount in the logical storage area 11 designated in step s701 (step s702). After receiving the update data request message, the storage subsystem 100 refers to the update data information 1005 by the update data amount monitor program 1008. To be specific, using the logical storage area identification information 10051, the information recorded in the update data amount 10054 is forwarded to the storage subsystem 100 (step s703). The information recorded is the one in the primary logical storage area being the logical storage area 11 designated in step s701 (step s703). After receiving the logical storage area identification information 10051 and the update data amount 10054 corresponding thereto, the backup management server 400 updates the primary logical storage area identification information 40012 and the update data amount 40024 of the backup operation information 4002 by the backup management program 4005 (step s704). By the storage area configuration management program 1007, the backup management server 400 then searches the logical storage area configuration information 1002 for the logical storage area 11 designated in step s701, thereby designating the RAID group 12 found in the RAID group identification information 10022 corresponding to the logical storage area 11 (s705). The backup management server 400 then updates the update data amount 40033 recorded in the power supply management information 4003 by the backup management program 4007 stored in the program memory (step s706).

Figure 25:
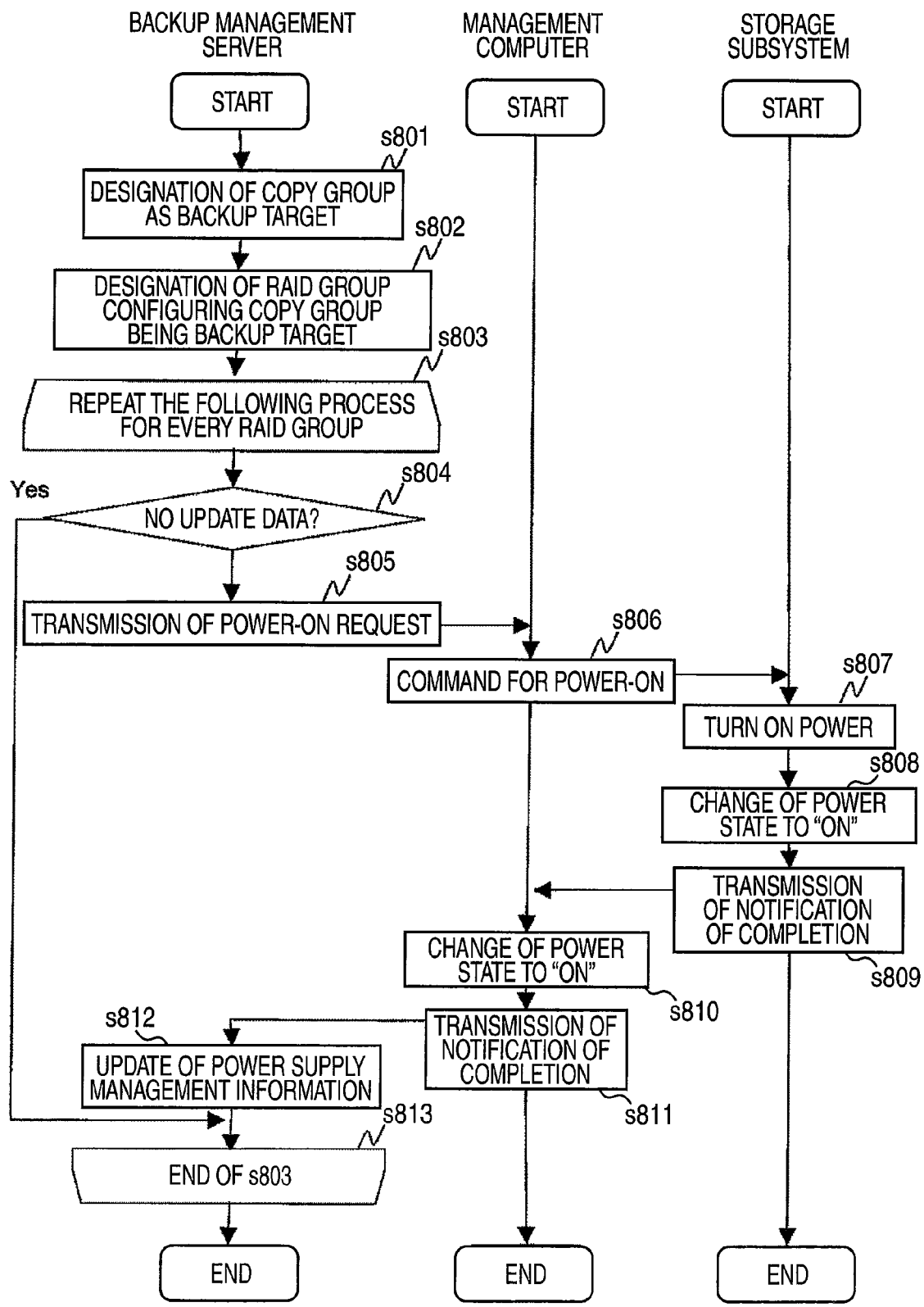
FIG. 25 is a diagram showing a power-ON process in the embodiment of the first example of the invention.

FIG. 25 shows the operation at the time of execution of backup from the primary logical storage area to the secondary logical storage area. To be specific, FIG. 25 shows the procedure of a process for the power supply device 130 to start a power supply to the RAID group 12 corresponding to the secondary logical storage areas 11 not provided with a power supply needed for normal operation as is operated in the power saving mode.

The backup management server 400 starts execution of backup at the time recorded in the copy start time 40015 of the backup management information 4001 by the power supply start request program 4008 stored in the program memory 4000. First of all, any of the copy groups 13 recorded in the copy group number 40011 being a backup target is designated (step s801). Thereafter, by the power supply start request program 4008 stored in the program memory of the backup management server 400, the power supply management information 4003 is referred to, thereby designating the copy-destination RAID group 12 recorded in the copy-destination RAID group identification information 40032 (step s802). The power supply start request program 4008 repeats the following processes with respect to all of the RAID groups 12 found in the copy group being the backup target (step s803). Herein, a power supply may be started, with a higher priority, to the RAID group configuring the secondary logical storage area under the smaller copy order number.

The power supply control program 4008 refers to the power supply management information 4003, and determines whether or not the value in the update data amount 40033 is "0 GB" (step s804). When the determination result in step s804 is Yes, the procedure goes to steps 813. With such a determination process, it is known that the update amount of data for backup is 0 GB, and when there is no need for backup, it is possible to avoid to start a power supply to the copy-destination RAID group. As such, this thus can reduce the power consumption at the time of backup.

On the other hand, when the determination result in step s804 is No, the procedure goes to steps s805 to s812. By the power supply start request program 4008 stored in the program memory of the backup management server 400, a request is issued to the management computer 500 to transmit a message to start a power supply to the copy-destination RAID group 12 (step s805). After receiving such a message from the backup management server 400, the management computer 500 refers to the power supply information 1006 by the power supply control command program 5004, and to the storage subsystem 100, forwards the power supply start command message for the copy-destination RAID group 12 (step s806). After receiving the power supply start command message, the storage subsystem 100 starts a power supply by the power supply device 130 to the copy-destination RAID group 12 by the power supply control program 1012 (step s807). The power supply control program 1012 changes the value, to "ON", of the power supply state 10062 corresponding to the RAID group 12 recorded in the RAID group identification information 10061 in the power supply information 1006 (step s808). Thereafter, the power supply control program 1012 of the storage subsystem 100 forwards a notification of normal completion to the management computer 500 (step s809). After receiving such a notification of normal completion, the management computer 500 changes, to "ON", the value of the power supply state 10062 corresponding to the RAID group 12 found in the RAID group identification information 10061 in the power supply information 1006 (step s810). The management computer 500 forwards a notification of normal completion to the backup management server 400 by the power supply control command program 5004 (step s811). The power supply start command program in the backup management server 400 having received the notification of normal completion provided by the management computer 500 changes, to "ON", the power supply state 40034 corresponding to the RAID group recorded in the copy-destination RAID group identification information 40032 in the power supply management information 4003 (step s812).

As such, after the backup process is started, by making a power supply to the HDDs configuring the copy-destination RAID group by a unit of copy group for execution of backup, the wait time for the mode change can be reduced, i.e., until the RAID groups corresponding to the secondary logical storage areas are changed in mode from power saving to normal. Accordingly, the backup time can be favorably reduced. Herein, the procedure from steps s803 to s813 for making a power supply to the RAID group may be executed with respect to a plurality of RAID groups 12 all at once.

For preventing any possible performance deterioration of the storage subsystem 100 due to overload, the number of the RAID groups 12 possibly subjected to the power-ON process in step s807 all at once has an upper limit. As the control method for not exceeding the upper limit of the number of the RAID groups that can be changed in mode to normal all at once, the storage subsystem 100 may control the process duplication, and the power supply control command program 5004 in the management computer 500 may control the number of power supply start request commands in step s806.

Figure 26:
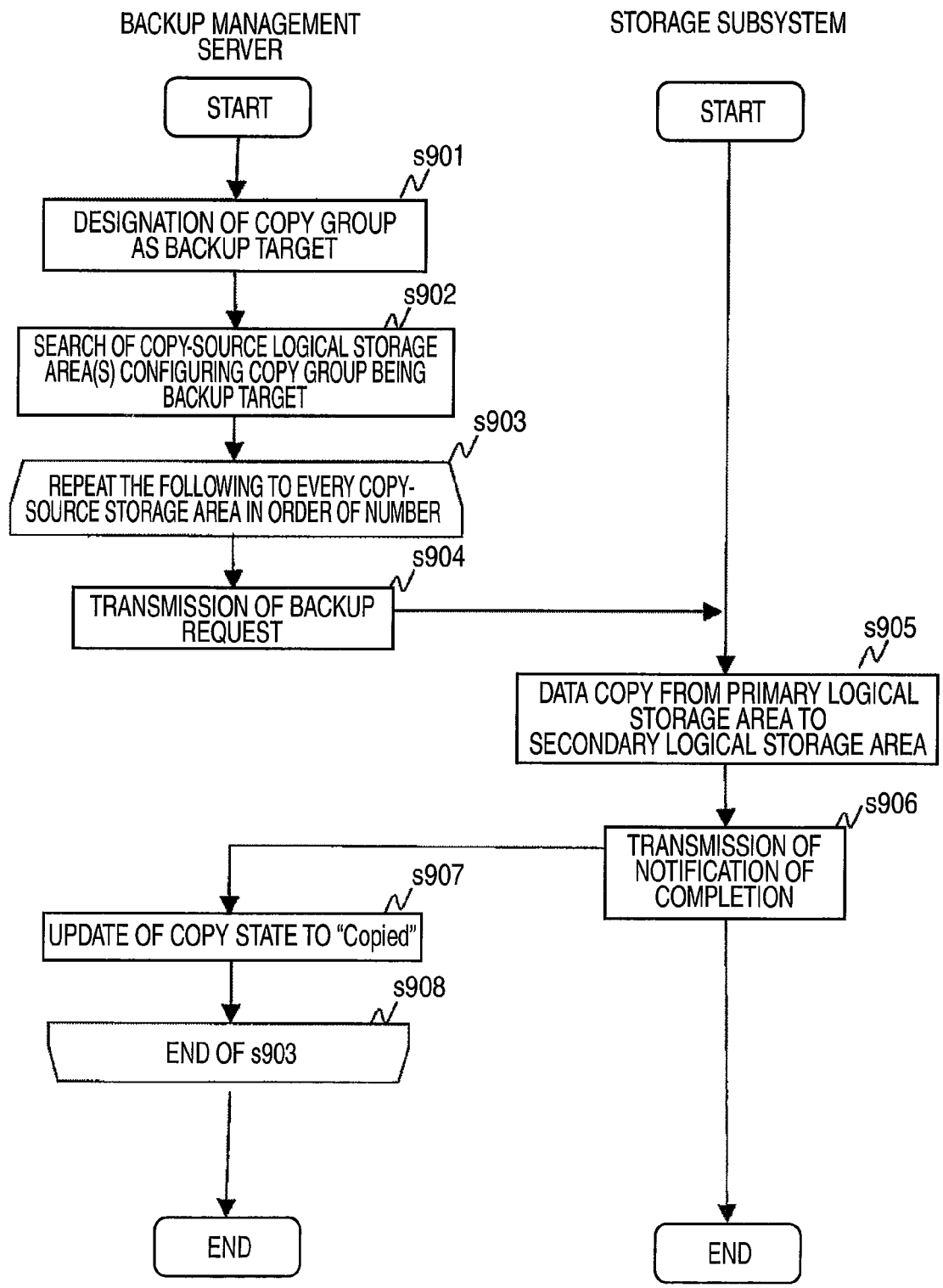
FIG. 26 is a diagram showing a backup process in the embodiment of the first example of the invention.

FIG. 26 shows the procedure of a data copy process from the primary logical storage areas to the secondary logical storage areas at the time of backup. This process is sequentially executed after a lapse of time recorded in the copy start time 40015 in the backup management information 4001, and after the RAID group configuring the secondary logical storage areas under the copy order number of "1" is changed in mode from power saving to ready.

The backup management server 400 designates at least one of the copy groups 13 recorded in the copy group number 40011 by the backup management program 4005 stored in the program memory as a backup target (step s901). By the backup management program 4005 stored in the program memory of the backup management server 400, a search is made to the backup operation information 4002 to find the logical storage areas 11 recorded in the primary logical storage area identification information 40022 found in the copy group designated as the backup target (step s902). Thus found logical storage areas are repeatedly subjected to the following process in order of copy order numbers (step s903). By the backup request program 4007 stored in the program memory of the backup management server 400, a backup request is forwarded to the logical storage areas 11 found in the copy group designated as the backup target in the storage subsystem 100 (step s904). After receiving the backup request, by the backup data recording program 1011 stored in the program memory, the storage subsystem 100 refers to the backup configuration information 1004, and reads the data in the logical storage areas 11 recorded in the primary logical storage area identification information 10041. Thus read data is then written to the logical storage areas 11 recorded in the corresponding secondary logical storage area 10042 (step s905). Note that, before data copy, when the RAID group 12 corresponding to the secondary logical storage areas 11 is in operation in the power saving mode, the wait time is generated until the power supply is made, and until the RAID group 12 is changed in mode to normal. After such a process, by the backup data recording program 1011 stored in the program memory of the storage subsystem 100, a notification of normal completion is forwarded to the backup management server (step s906). After receiving the notification of normal completion, by the backup management program 4007 stored in the program memory, the backup management server 400 changes, to "copied", the copy state corresponding to the logical storage areas 11 recorded in the copy state 40025 in the backup operation information 4002 (step s907).

Herein, the procedure from steps s903 to s908 may be executed to a plurality of logical storage areas 11 all at once.

Note that, for avoiding any possible performance deterioration of the storage subsystem 100 due to overload, the number of the logical storage areas 11 possibly subjected to the data copy process in step s905 all at once has an upper limit.

As the control method for not exceeding the upper limit as such, the storage subsystem 100 may control the process duplication, and the backup management server 400 may control the number of backup request commands in step s904.

Figure 27:
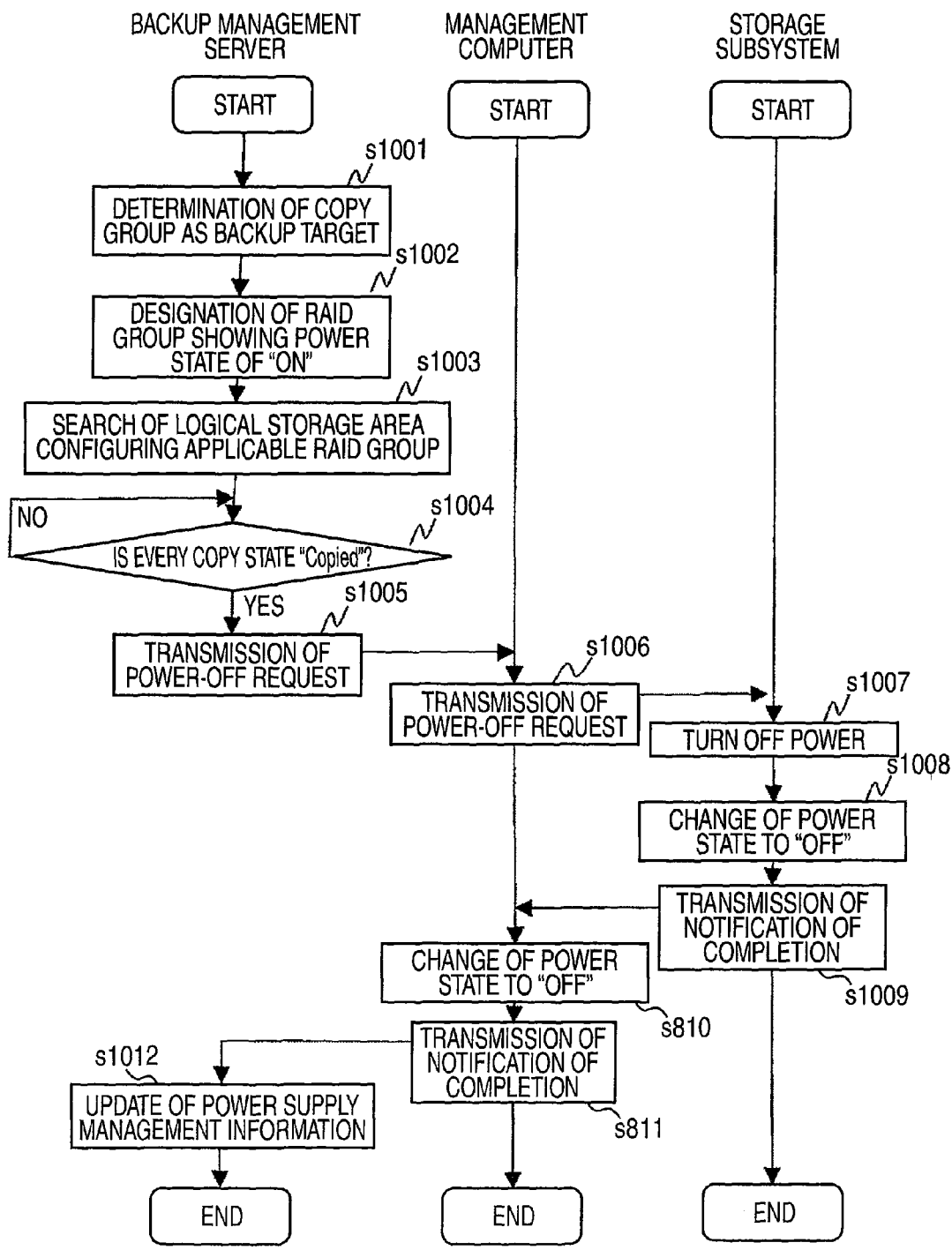
FIG. 27 is a diagram showing a power-OFF process in the embodiment of the first example of the invention.

FIG. 27 shows the procedure of a process for stopping a power supply by the power supply device 130 to the RAID groups configuring the secondary logical storage areas 11 through with the backup process. The backup management server 400 refers to the backup operation information 4002 by the power supply stop request program 4010 stored in the program memory, and selects any of the copy groups 13 as a backup target (step s1001) The power supply stop request program 4010 stored in the program memory of the backup management server 400 makes a search of the power supply management information 4003 to designate any of the RAID groups 12 recorded in the copy-destination RAID group identification information 40032 in which the power state 40034 shows the character string of "ON" (step s1002). The storage area configuration management program 1007 refers to the logical storage area configuration information 1002, and makes a search of the logical storage areas (step s1003). The backup management program 4005 refers to the backup operation information 4002, and determines whether all of the logical storage areas 11 configuring the designated RAID group show "Copied" in the copy state 40026 (step s1004). When the determination result is "Yes", the power supply stop request program 4010 stored in the program memory of the backup management server 400 asks the management computer 500 to transmit a message of stopping a power supply to the designated RAID group 12 (step s1005). After receiving such a message from the backup management server 400, the management computer 500 refers to the power supply information 1006 by the power supply control command program 5004, and forwards a power supply stop command message to the storage subsystem 100 for the RAID group 12 (step s1006). The power supply control program 1012 in the storage subsystem 100 having received the power supply stop command message accordingly stops the power supply by the power supply device 130 to the designated RAID group 12 (step s1007). The power supply control program 1012 changes, to "OFF", the value of the power supply state 10062 corresponding to the RAID groups 12 recorded in the RAID group identification information 10061 in the power supply information 1006 (step s1008). The power supply control program 1012 of the storage subsystem 100 forwards a notification of normal completion to the management computer 500 (step s1009). After receiving the notification of normal completion, the management computer 500 changes, to "OFF", the value of the power supply state 10062 in the power supply information 1006 by the power supply control command program 5004 (step s1010). The power supply state 10062 here is the one corresponding to the RAID groups 12 recorded in the RAID group identification information 10061 of the power supply information 1006. The power supply control command program 5004 in the management computer 500 forwards a notification of normal completion to the backup management server 400 (step s1011). In the power supply management information 4003, the power supply stop request program 4010 stored in the program memory of the backup management server 400 having received the notification of normal completion changes, to "OFF", the character string in the power supply state 40034 corresponding to the RAID groups 12 recorded in the copy-destination RAID group identification information 40032 (step s1012). Herein, when the determination result of step s1004 is "No", the determination is made again with the determination order for the RAID group being the last.

Figure 28:
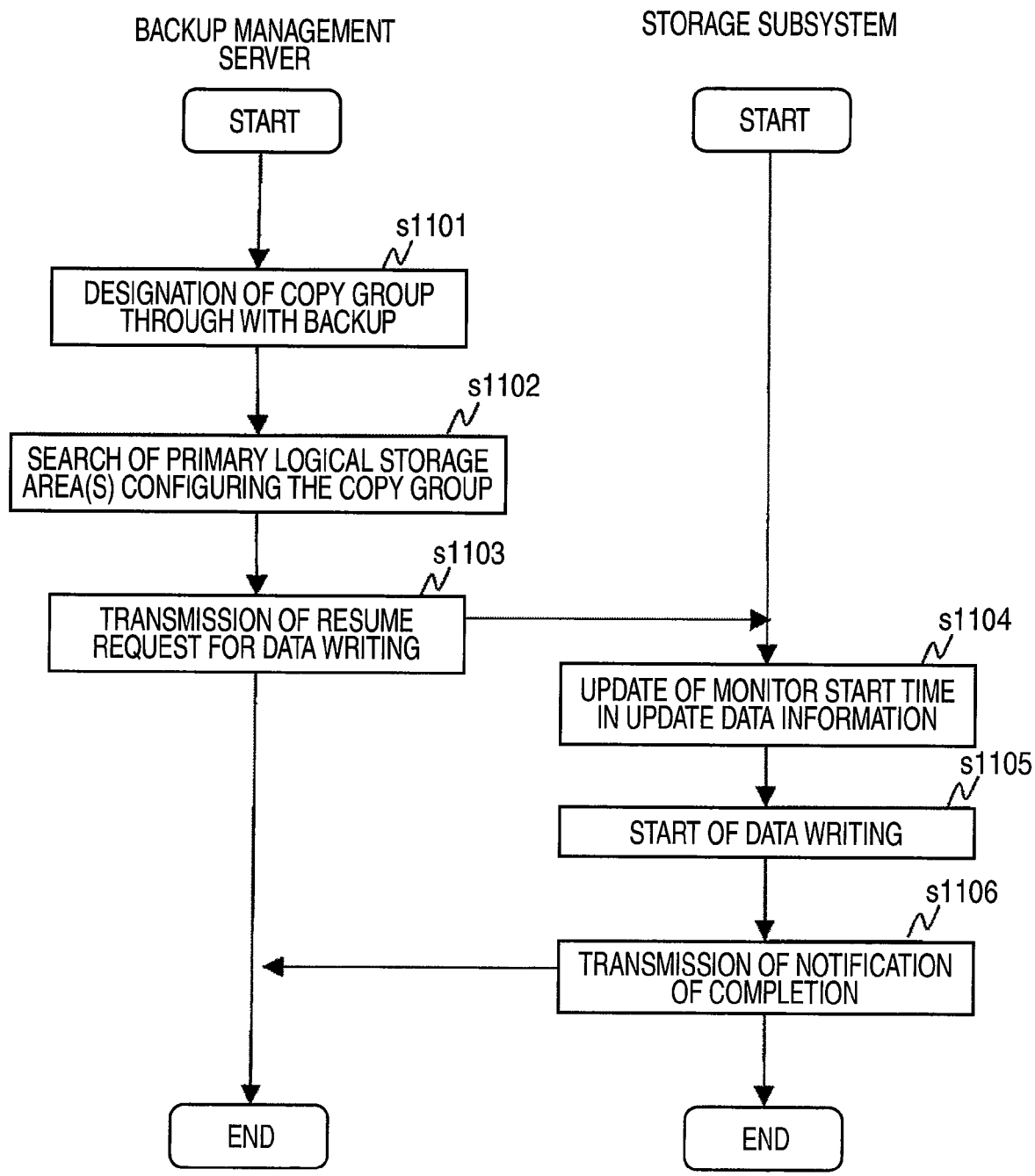
FIG. 28 is a diagram showing a writing resume process in the embodiment of the first example of the invention.

FIG. 28 shows a flowchart of the procedure of a process for resuming writing to the primary logical storage areas after completion of the backup process. This process is executed after the process in step s908 is completed in the backup management server 400.

The backup management server 400 refers to the backup operation information 4002 by the backup management program 4005 stored in the program memory, and designates any of the copy groups 13 recorded in the copy group number 40021 showing the character string of "Copied" in the corresponding copy state 40025 (step s1101). The backup management program 4005 refers to the backup operation information 4002, and makes a search of the logical storage areas 11 recorded in the primary storage area identification information 40022 (step s1102). The backup management program 4005 stored in the program memory of the backup management server 400 forwards a request message of asking for the storage subsystem 100 to resume the data writing to the logical storage areas 11 (step s1103). The update data amount monitor program 1008 stored in the program memory of the storage subsystem 100 having received the data writing resume request message from the backup management server 400 refers to the update data information 1005, and updates the value in the monitor start time 10052 corresponding to the logical storage areas recorded in the logical storage area identification information 10051 (step s1104). The data writing program 1010 stored in the program memory of the storage subsystem 100 resumes the data writing process with respect to the logical storage areas (step s1105). The data writing program 1010 stored in the program memory of the storage subsystem 100 forwards a notification of normal completion to the backup management server 400 (step s1106).

Second Example

A second example shows an example of determining a secondary logical storage area depending on whether copy is performed or not to a primary logical storage area. In this manner, the RAID groups 12 can be reduced in number for a power supply at the time of backup, thereby being able to favorably reduce the power consumption in the storage subsystem 100.

Described below is the process of the second example different from that in the first example. Any process similar to that in the first example is not described again. Note that this process is executed in the storage subsystem 100 after transmission of a completion notification of step s604 in the first example, and is executed between the backup setup process 1 of FIG. 23 and the backup setup process 2 of FIG. 24.

The storage subsystem 100 refers to the update data information 1005 using the backup management program 4005. From the logical storage area smaller in value of the update data amount, a recording is made to the primary storage area identification information 10041 in the logical storage area backup configuration information 1004. When any logical storage areas have the same value in the update data amount 10054, a recording is made to the primary storage area identification information 10041 in the logical storage area backup configuration information 1004 in order recorded in the logical storage area identification information 10051.

The backup management program 4005 refers to the logical storage area configuration information 1002, and groups any corresponding logical storage area identification information 10021 according to the RAID groups 12 recorded in the RAID group identification information 10022, thereby sequentially making a recording to the secondary logical storage areas 10042 in the backup configuration information.

Herein, the backup configuration information acquisition process from steps s301 to s303 of FIG. 20 is presumably executed as the need arises.

Figure 29:
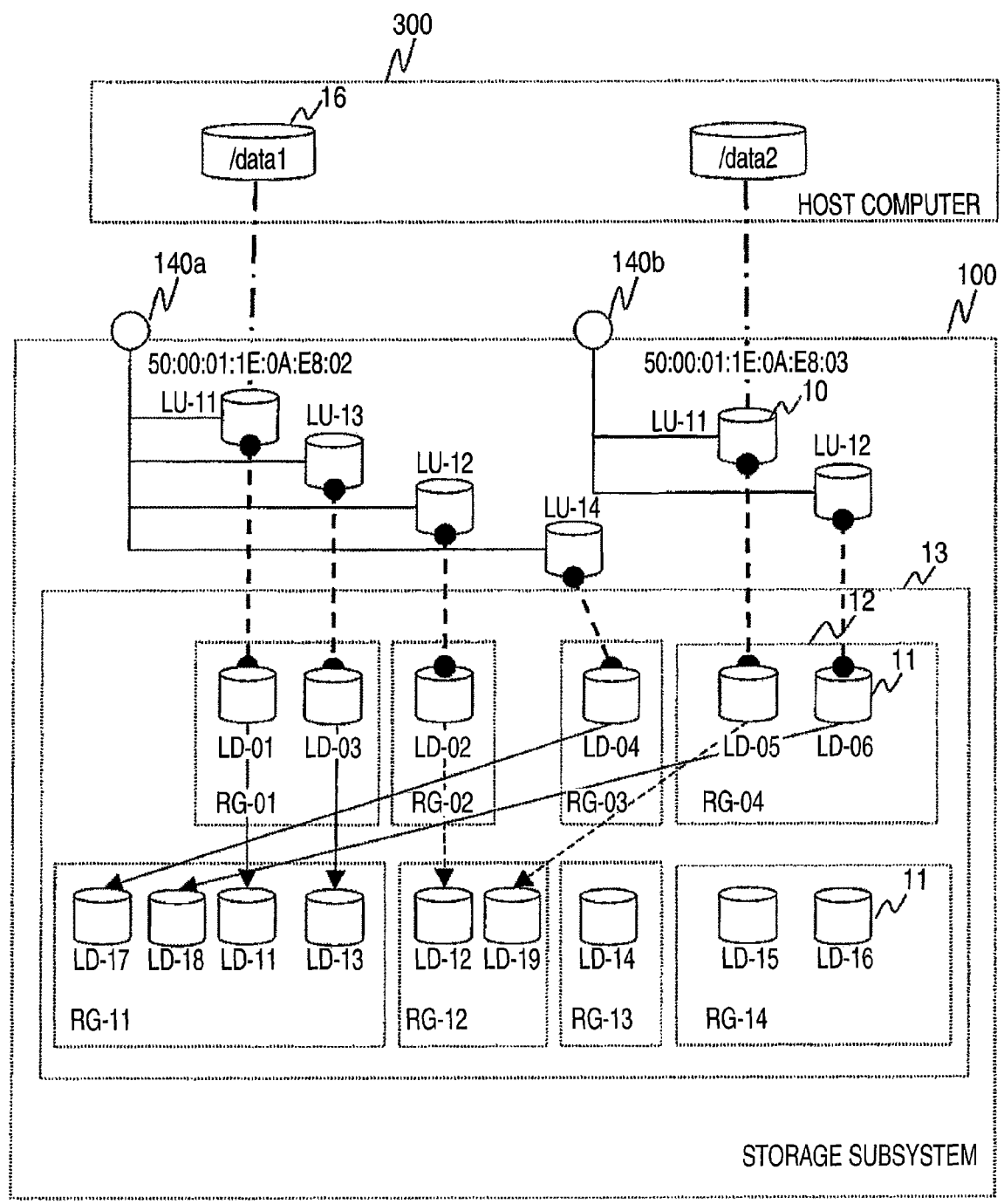
FIG. 29 is a diagram showing an exemplary storage configuration in an embodiment of a second example of the invention.

FIG. 29 shows an exemplary configuration of the second example. Exemplified here is a case where there is update data in the primary logical storage areas "LD-01", "LD-03", "LD-04", and "LD-06" but not in the primary logical storage areas "LD-02" and "LD-05" (FIG. 10). In this case, the secondary logical storage areas 11 corresponding to the primary logical storage areas "LD-01", "LD-03", "LD-04", and "LD-06" are configured by one RAID group 12. Moreover, the secondary logical storage areas 11 corresponding to the primary logical storage areas "LD-02" and "LD-05" are configured by another RAID group different from the RAID group 12 above. That is, such a configuration can be implemented by restructuring the configuration of FIG. 2, i.e., the secondary logical storage area for the primary logical storage area "LD-04" is "LD-17", the secondary logical storage area for the primary logical storage area "LD-06" is "LD-18", and the secondary logical storage area for the primary logical storage area "LD-05" is "LD-19".

FIG. 30 shows the power supply information after the implementation of the second example. In FIG. 15, a power supply is required for the RAID groups "RG-11", "RG-13", and "RG-14", and by this technology, the RAID group requiring a power supply is only "RG-11".

Third Example

In a third example, the storage area being a copy destination for the storage subsystem 100 is exemplified by a virtual tape library (VTL). Herein, no consideration is given to the bender of the virtual tape library. To the secondary logical storage area having been recognized as a virtual tape, the technology of the first or second embodiment is applied.

Figure 31:
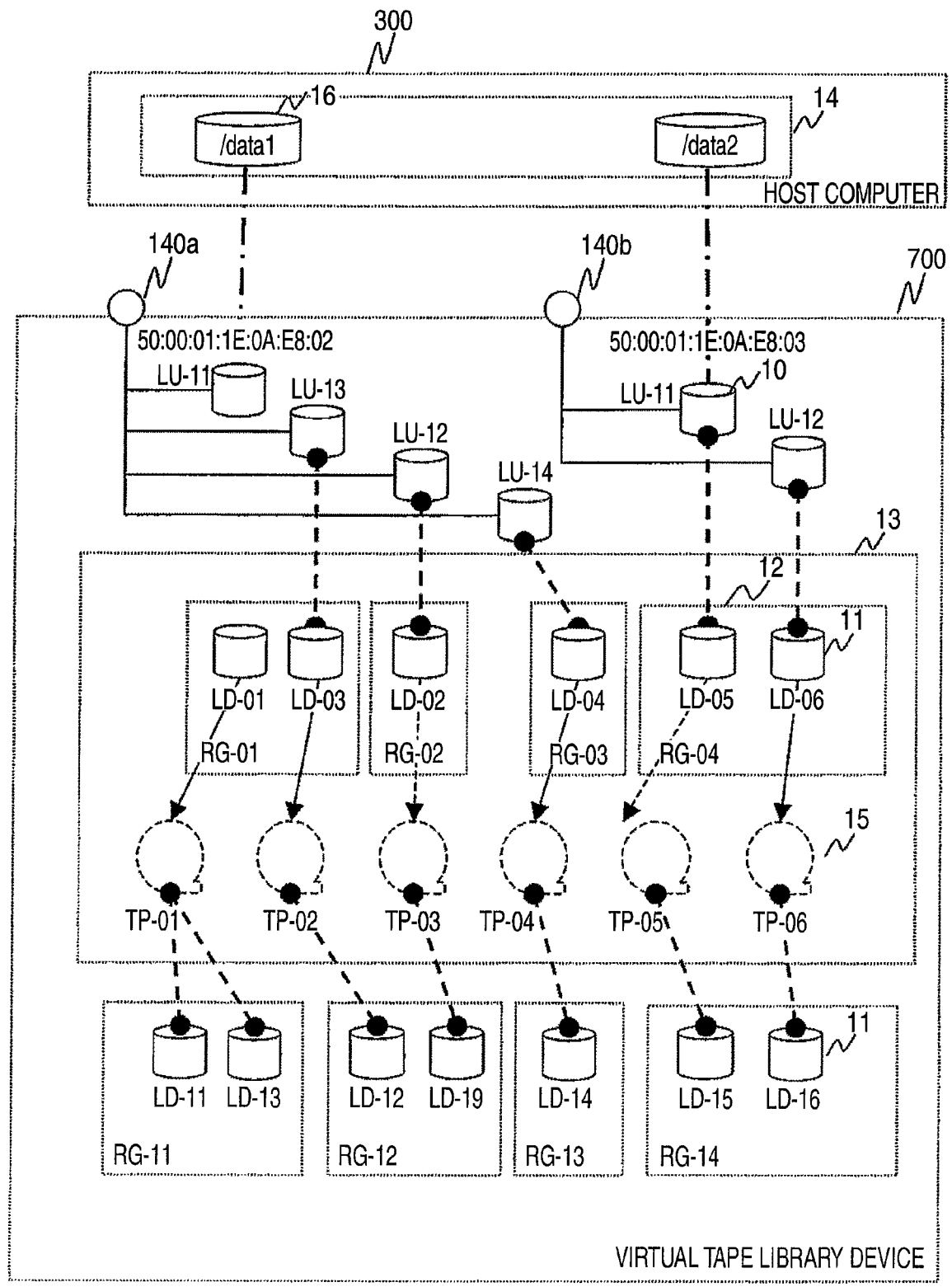
FIG. 31 is a diagram showing the configuration of a virtual tape library in an embodiment of a third example of the invention.

FIG. 31 shows an exemplary configuration when the secondary logical storage area is recognized as a virtual tape, as a storage area of the copy-destination. That is, as a copy destination, a virtualized tape recording medium 15 is defined, and this virtual tape recording medium 15 is correlated to the logical storage area 11. To the storage device configuring such correlated logical storage areas, the technology of the first or second embodiment is applied.

FIG. 32 shows an exemplary configuration of virtual tape library configuration information 5002 to be stored in the program memory of the management computer 500. The virtual tape recording media 15 recorded in tape recording medium information 50021 are correlated to the logical storage areas 11 recorded in logical storage area identification information 50022, i.e., areas from a start block address 50023 to an end block address 50024. For example, the tape recording medium "TP-01" on the virtual tape library device 700 is correlated to the logical storage areas "LD-11" and "LD-13" of the storage subsystem 100.

The backup data recording program 1011 in the virtual tape library having received the backup request from the backup management server 400 refers to the virtual tape library 5002, and executes the backup data copy to the virtual tape recording media 15 corresponding to the logical storage areas 11 each being a backup-destination target. As such, in the configuration to which the virtual tape library is applied to the secondary logical storage areas 11, the technologies of the first and second examples are applied.

Fourth Example

The copy configurations in the first and second examples may be each of a cascade configuration in which the secondary logical storage areas 11 are each subjected also to backup copy as a copy source. The fourth example shows how to implement the first and second example in the cascade configuration.

Figure 33:
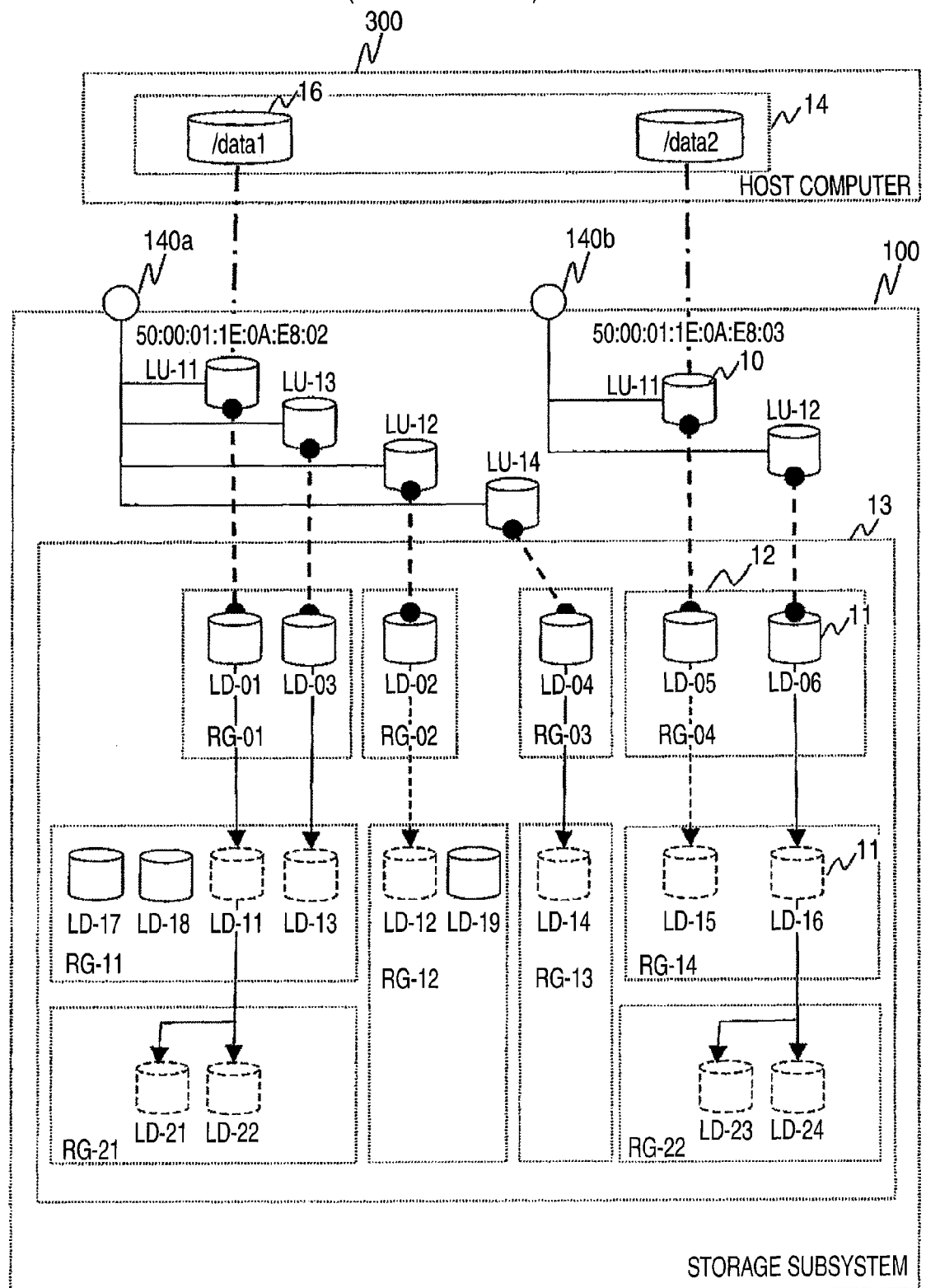
FIG. 33 is a diagram showing an exemplary storage configuration in an embodiment of a fourth example of the invention.

FIG. 33 shows an exemplary configuration of a storage subsystem of the cascade configuration in which the secondary logical storage areas 11 are subjected also to backup copy each as a copy source. To be specific, as the copy destination for the secondary logical storage area "LD-11", "LD-21" and "LD-22" are registered. Moreover, as the copy destination for the secondary logical storage area "LD-16", "LD-23" and "LD-24" are registered. In this example, only when first hierarchy copy is performed from "LD-01" to "LD-11", i.e., only when data update is performed, second hierarchy copy is performed from "LD-11" to "LD-21" and "LD-22". For implementation thereof, the "LD-11" is set as a primary logical storage area, and "LD-21" and "LD-22" are each set as a secondary logical storage area, and the process is executed as the flowcharts of FIGS. 25 to 27. Herein, the first hierarchy copy and the second hierarchy copy are not necessarily executed at the same time.

Fifth Example

The configurations of the first and second examples for copying may be of remote copy configuration, in which the storage subsystem including the primary logical storage areas 11 is different from the storage subsystem including the secondary logical storage areas 11. That is, the fifth example shows how to implement the first and second examples with the remote copy configuration.

Figure 34:
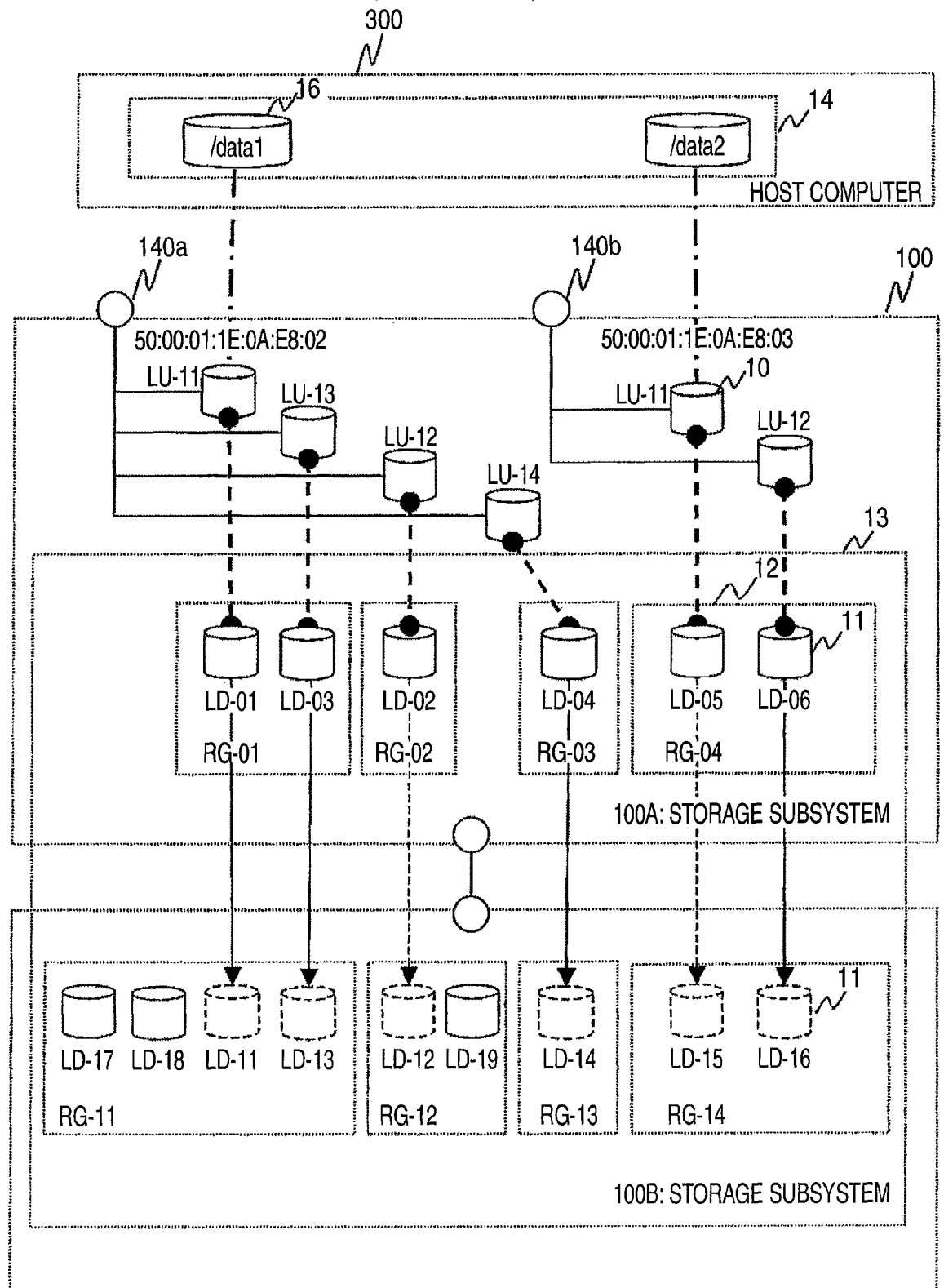
FIG. 34 is a diagram showing an exemplary storage configuration in an embodiment of a fifth example of the invention.

FIG. 34 shows an exemplary remote copy configuration in which the storage subsystem including the primary logical storage areas is different from the storage subsystem including the secondary logical storage areas. The storage subsystem including the primary logical storage areas is connected to the storage subsystem including the secondary logical storage areas over a network. In this example, the process procedures of FIGS. 25 and 27 for a power supply are applied to a copy-destination storage subsystem 100B.

What is claimed is:

1. A storage subsystem, comprising: a controller; a first logical storage area in a RAID (Redundancy Array of Independent Disks) group configured by a plurality of storage devices; and
a second logical storage area in a plurality of RAID groups each configured by the plurality of storage devices, and storing a copy of data stored in the first logical storage area, wherein
the first and second logical storage areas form a copy group, and
when starting copying of the data from the first logical storage area to the second logical storage area, the controller performs a mode change, from a power saving mode to a ready mode, to the plurality of storage devices configuring the plurality of RAID groups corresponding to the second logical storage area, wherein when starting copying of the data from the first logical storage area to the second logical storage area, the controller makes, remain in the power saving mode, the plurality of storage devices configuring the RAID groups corresponding to any part of the second logical storage area being not a target for the copying of the data, wherein when starting copying of the data from the first logical storage area to the second logical storage area, the controller makes the mode change, from the power saving mode to the ready mode, starting from the storage devices configuring the RAID groups corresponding to any part of the second logical storage area being the target for the copying at the earliest timing.

2. The storage subsystem according to claim 1, wherein a process of performing the mode change to the storage devices from the power saving mode to the ready mode is executed simultaneously to the storage devices configuring the plurality of RAID groups.

3. The storage subsystem according to claim 1, wherein
when the copy is completed to any part of the second logical storage area in the RAID groups configured by the storage devices in the ready mode, the controller performs the mode change to the storage devices from the ready mode to the power saving mode.

4. The storage subsystem according to claim 3, wherein
the controller determines an order for the copying from the first logical storage area to the second logical storage area based on the RAID groups including the second logical storage area.

5. The storage subsystem according to claim 1, wherein
the controller determines an area of the second logical storage area for storing the copy of the data based on an amount of the data for the copying from an area of the first logical storage area.

6. The storage subsystem according to claim 1, wherein
the power saving mode is no power supply to the storage devices.

7. The storage subsystem according to claim 1, further comprising
a third logical storage area in a plurality of the RAID groups each configured by the plurality of storage devices, and storing a copy of data stored in the second logical storage area, wherein
the second and third logical storage areas form a copy group, and
when starting copying from the second logical storage area to the third logical storage area, the controller performs the mode change, from the power saving mode to the ready mode, to the plurality of storage devices configuring the plurality of RAID groups corresponding to the third logical storage area.

8. A storage system, comprising: a first storage subsystem including a controller, and a first logical storage area in a RAID group configured by a plurality of storage devices; and
a second storage subsystem including a second logical storage area in a plurality of the RAID groups each configured by the plurality of storage devices, wherein
the first storage subsystem couples with the second storage subsystem over a network, the first and second logical storage areas form a copy group, and the controller stores a copy of data stored in the first logical storage area into the second storage area thorough the network, and
when starting copying from the first logical storage area to the second logical storage area, the controller performs a mode change, from a power saving mode to a ready mode, to the plurality of storage devices configuring the plurality of RAID groups corresponding to the second logical storage area, wherein when starting copying of the data from the first logical storage area to the second logical storage area, the controller makes, remain in the power saving mode, the plurality of storage devices configuring the RAID groups corresponding to any part of the second logical storage area being not a target for the copying of the data, wherein when starting copying of the data from the first logical storage area to the second logical storage area, the controller makes the mode change, from the power saving mode to the ready mode, starting from the storage devices configuring the RAID groups corresponding to any part of the second logical storage area being the target for the copying at the earliest timing.

9. A method for controlling a storage subsystem including a first logical storage area in a RAID group configured by a plurality of storage devices, and a second logical storage area in a plurality of the RAID groups each configured by the plurality of storage devices and storing a copy of data stored in the first logical storage area, the method comprising the steps of:

forming a copy group by the first logical storage areas and second logical storage areas; and performing, when starting copying from the first logical storage area to second logical storage area, a mode change, from a power saving mode to a ready mode, to the plurality of storage devices configuring the plurality of RAID groups corresponding to the second logical storage area, wherein when starting the copying from the first logical storage area to the second logical storage area, the plurality of storage devices configuring the RAID groups corresponding to any part of the second logical storage area being not a target for the copying of the data from the first logical storage area are remained in the power saving mode, wherein when starting the copying from the first logical storage area to the second logical storage area, the mode change is performed from the power saving mode to the ready mode starting from the storage devices configuring the RAID groups corresponding to any part of the second logical storage area being the target for the copying at the earliest timing.

10. The control method according to claim 9, wherein a process of performing the mode change to the storage devices from the power saving mode to the ready mode is executed simultaneously to the storage devices configuring the plurality of RAID groups.

11. The control method according to claim 9, wherein when the copying is completed to any part of the second logical storage area in the RAID groups configured by the storage devices in the ready mode, the mode change is performed to the storage devices from the ready mode to the power saving mode.

12. The control method according to claim 11, wherein an order for the copying from the first to second logical storage area is determined based on the RAID groups including the second logical storage area.

13. The control method according to claim 9, wherein an area of the second logical storage area for storing the copy of the data is determined based on an amount of data for the copying from an area of the first logical storage area.

14. The control method according to claim 9, wherein the power saving mode is no power supply to the storage devices.

15. The control method according to claim 9, wherein the storage device further includes a third logical storage area in a plurality of the RAID groups each configured by the plurality of storage device, and storing a copy of data stored in the second logical storage area, the second and third logical storage areas form a copy group, and when starting copying from the second to third logical storage area, the mode change is performed, from the power saving mode to the ready mode, to the plurality of storage devices configuring the plurality of RAID groups corresponding to the third logical storage area.

16. A control method for controlling a storage system including a first storage subsystem provided with a controller and a first logical storage area in a RAID group configured by a plurality of storage devices, and a second storage subsystem provided with a second logical storage area in a plurality of the RAID groups each configured by the plurality of storage devices, and in the storage system, the first storage subsystem is connected to the second storage subsystem over a network, the method comprising the steps of:

forming a copy group by the first and second logical storage areas;

storing a copy of data stored in the first logical storage area into the second storage area over the network; and performing, when starting copying from the first to second logical storage area, a mode change, from a power saving mode to a ready mode, to the plurality of storage devices configuring the plurality of RAID groups corresponding to the second logical storage area, wherein when starting the copying from the first logical storage area to the second logical storage area, the plurality of storage devices configuring the RAID groups corresponding to any part of the second logical storage area being not a target for the copying of the data from the first logical storage area are remained in the power saving mode, wherein when starting the copying from the first logical storage area to the second logical storage area, the mode change is performed from the power saving mode to the ready mode starting from the storage devices configuring the RAID groups corresponding to any part of the second logical storage area being the target for the copying at the earliest timing.

* * * * *